(12) United States Patent
Hashimoto

(10) Patent No.: US 7,227,604 B2
(45) Date of Patent: Jun. 5, 2007

(54) REFLECTIVE LIQUID CRYSTAL DISPLAY DEVICE HAVING FIRST AND SECOND OBLIQUELY EVAPORATED ALIGNMENT FILMS, FOR PREVENTING BURN-IN

(75) Inventor: Shunichi Hashimoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 275 days.

(21) Appl. No.: 10/935,653

(22) Filed: Sep. 7, 2004

(65) Prior Publication Data

US 2005/0057715 A1    Mar. 17, 2005

(30) Foreign Application Priority Data

Sep. 11, 2003    (JP)    ............................ P2003-319402

(51) Int. Cl.
*G02F 1/1337*    (2006.01)
(52) U.S. Cl. ...................................... 349/125; 349/130
(58) Field of Classification Search ................ 349/125, 349/130
See application file for complete search history.

(56) References Cited

U.S. PATENT DOCUMENTS

| 4,232,946 | A |   | 11/1980 | Gharadjedaghi et al. |         |
|-----------|---|---|---------|----------------------|---------|
| 5,268,781 | A | * | 12/1993 | Shigeta et al.       | 349/125 |
| 6,141,074 | A | * | 10/2000 | Bos et al.           | 349/129 |
| 6,327,093 | B1| * | 12/2001 | Nakanishi et al.     | 359/634 |
| 6,426,786 | B1| * | 7/2002  | Lu et al.            | 349/125 |

FOREIGN PATENT DOCUMENTS

| EP | 0 541 388 A1 | 5/1993  |
|----|--------------|---------|
| JP | 51-9853      | 1/1976  |
| JP | 53-5993      | 1/1978  |
| JP | 53-130054    | 11/1978 |
| JP | 54-040653    | 3/1979  |
| JP | 56-088113    | 7/1981  |
| JP | 56-091217    | 7/1981  |
| JP | 56-137330    | 10/1981 |
| JP | 57-112714    | 7/1982  |
| JP | 05-257146    | 10/1993 |
| JP | 2001-005003  | 1/2001  |
| JP | 2003-107482  | 4/2003  |

\* cited by examiner

*Primary Examiner*—Andrew Schechter
(74) *Attorney, Agent, or Firm*—Sonnenschein Nath & Rosenthal LLP

(57) ABSTRACT

In a reflective liquid crystal display device according to the invention, burn-in in a long-term drive which occurs due to asymmetric structures of side surfaces of an inter-pixel groove can be prevented, and long-term drive reliability can be achieved. A first obliquely evaporated alignment film is formed on a first side surface of the inter-pixel groove in a sectional surface of a pixel electrode substrate in a thickness direction through evaporation, and a second obliquely evaporated alignment film is formed on a second side surface facing the first side surface through evaporation. Thereby, the film structures of both side surfaces of the inter-pixel groove in the sectional surface become symmetric, so burn-in in a long-term drive which occurs due to the asymmetric structures of the side surfaces of the inter-pixel groove can be prevented.

12 Claims, 14 Drawing Sheets

FIG. 6A PIXEL A

FIG. 6B PIXEL B

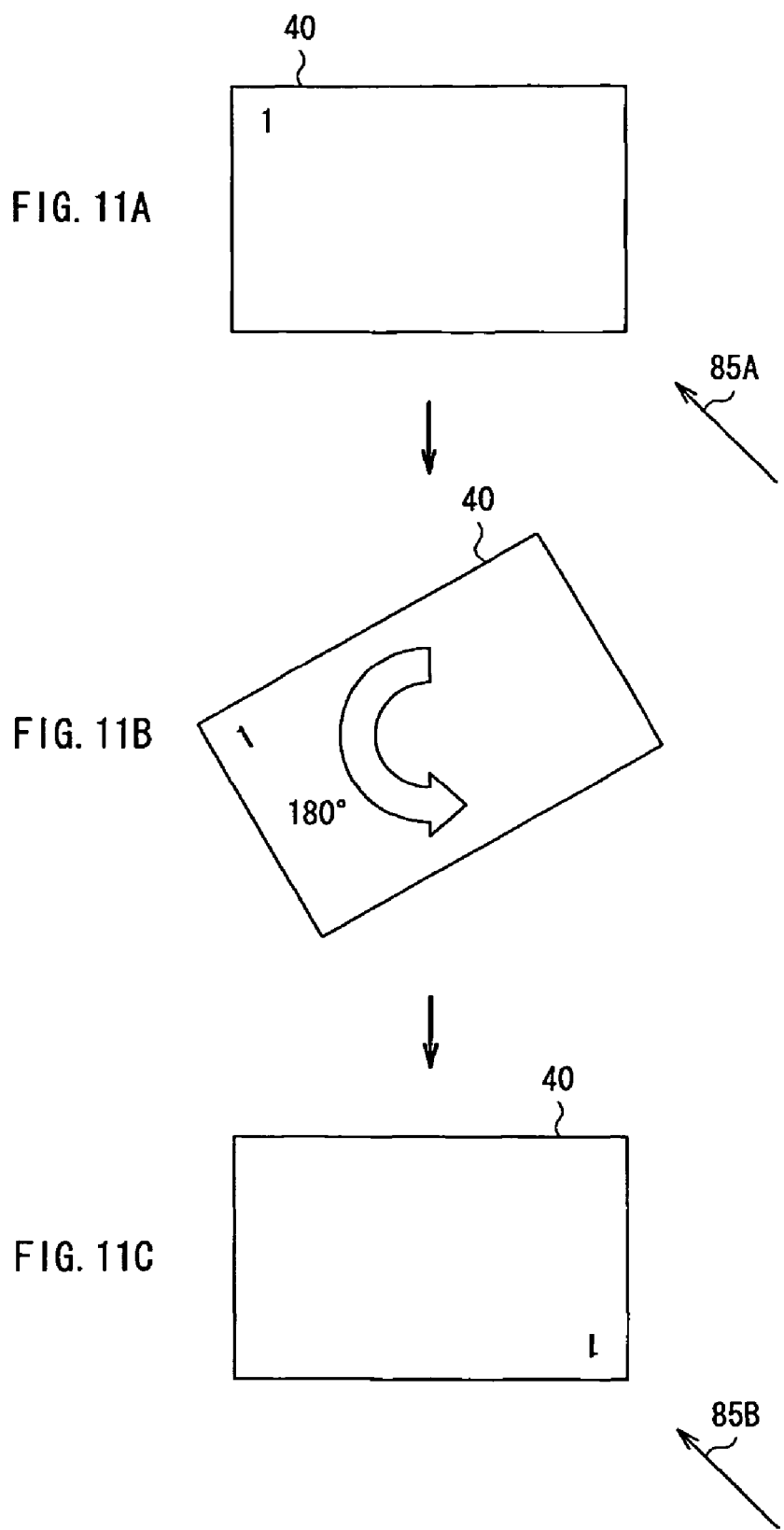

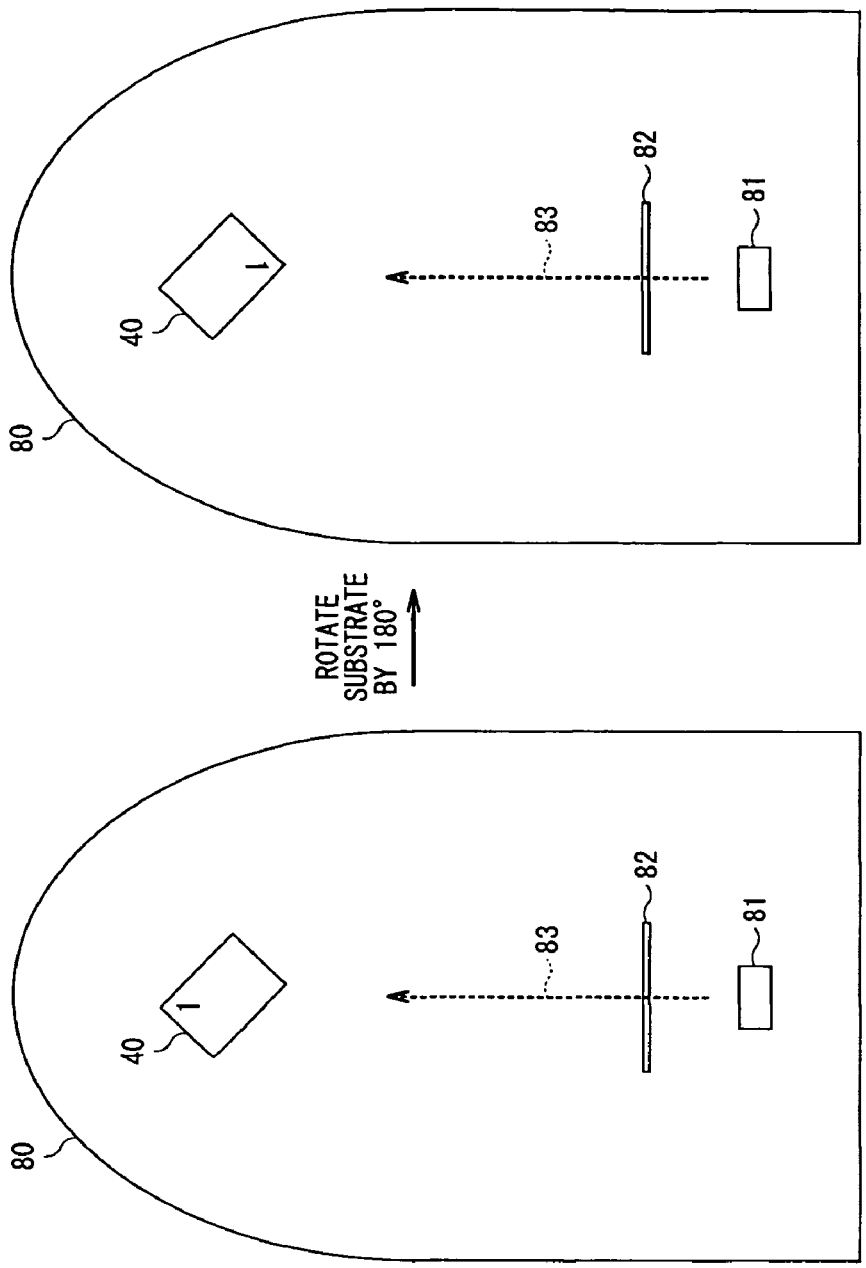

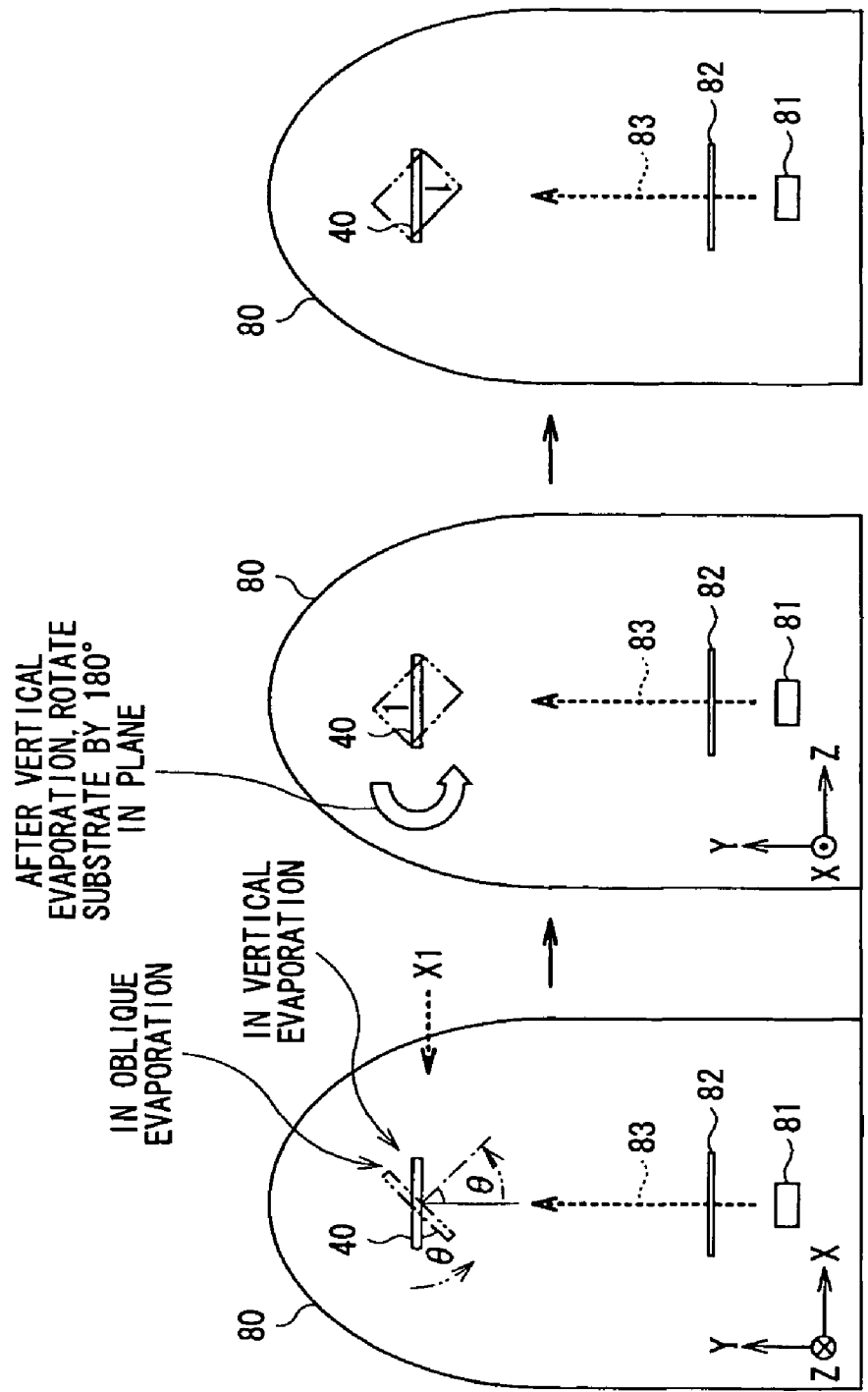

| | THICKNESS OF VERTICALLY EVAPORATED FILM (nm) | THICKNESS OF FILM OBLIQUELY EVAPORATED AFTER ROTATING SUBSTRATE BY 180° FROM ORIGINAL ALIGNMENT DIRECTION (nm) | THICKNESS OF FILM OBLIQUELY EVAPORATED FROM ORIGINAL ALIGNMENT DIRECTION (nm) | THICKNESS OF PASSIVATION FILM (nm) | BURN-IN IN INTER-PIXEL GROOVE IN LONG-TERM DRIVE |
|---|---|---|---|---|---|
| COMPARATIVE EXAMPLE 1-1 | — | — | 80 | — | OBSERVED AFTER 1000 HR DRIVE |
| COMPARATIVE EXAMPLE 1-2 | — | — | 80 | 45 | OBSERVED AFTER 1000 HR DRIVE |
| EXAMPLE 1-1 | — | 40 | 40 | — | NOT OBSERVED AFTER 1000 HR DRIVE |
| EXAMPLE 1-2 | — | 40 | 40 | 45 | NOT OBSERVED AFTER 1000 HR DRIVE |
| EXAMPLE 2-1 | 50 | 40 | 40 | — | NOT OBSERVED AFTER 1000 HR DRIVE |
| EXAMPLE 2-2 | 50 | 40 | 40 | 45 | NOT OBSERVED AFTER 1000 HR DRIVE |

FIG. 15

REFLECTIVE LIQUID CRYSTAL DISPLAY DEVICE HAVING FIRST AND SECOND OBLIQUELY EVAPORATED ALIGNMENT FILMS, FOR PREVENTING BURN-IN

RELATED APPLICATION DATA

The present application claims priority to Japanese Application(s) No(s). P2003-319402 filed Sep. 11, 2003, which application(s) is/are incorporated herein by reference to the extent permitted by law.

BACKGROUND OF THE INVENTION

1. Field of the Invention

The present invention relates to a reflective liquid crystal display device comprising a reflective pixel electrode, a method of manufacturing the reflective liquid crystal display device, and a liquid crystal display unit such as a reflective liquid crystal projector which displays an image through the use of the reflective liquid crystal display device.

2. Description of the Related Art

In recent years, with improvement in definition, miniaturization and brightness of projection displays, as display devices of the projection displays, reflective devices capable of reducing their size and displaying with high definition, and being expected to have high light utilization efficiency have become a focus of attention and have been put to practical use. A well-known reflective device is an active type reflective liquid crystal device in which a liquid crystal is injected between a pair of substrates facing each other. In this case, as the pair of substrates, a transparent electrode substrate formed through laminating a transparent electrode on a glass substrate, and a drive substrate using a silicon (Si) substrate including, for example, a CMOS (Complementary-Metal Oxide Semiconductor) type semiconductor circuit are used. On the drive substrate, a reflective pixel electrode of metal for reflecting light and applying a voltage to the liquid crystal is disposed so as to form a pixel electrode substrate. The reflective pixel electrode is made of a metal material including aluminum as a main component, which is generally used in a LSI (Large Scale Integrated) process.

In such a reflective liquid crystal display device, when a voltage is applied to the transparent electrode disposed on the transparent electrode substrate and the reflective pixel electrode disposed on the drive substrate, a voltage is applied to the liquid crystal. At this time, a change in optical properties of the liquid crystal occurs depending upon a potential difference between these electrodes, thereby the liquid crystal modulates incident light. The reflective liquid crystal display device can display a gray-scale image by the modulation of the light.

In such a reflective liquid crystal display device, specifically an active type reflective liquid crystal display device into which a vertically aligned liquid crystal is injected has become a focus of attention as a projection device in recent years, because the active type reflective liquid crystal display device has high contrast and high response speed. Herein, "a vertically aligned liquid crystal material" means a liquid crystal material with negative dielectric anisotropy (a difference $\Delta\epsilon$ $(=\epsilon(\|)-\epsilon(\bot))$ between a dielectric constant $\epsilon(\|)$ parallel to a long axis of liquid crystal molecules and a dielectric constant $\epsilon(\bot)$ perpendicular to the long axis of the liquid crystal molecules is negative), and in the vertical aligned liquid crystal material, when an applied voltage is zero, the liquid crystal molecules are aligned in a substantially vertical direction with respect to a substrate surface, thereby the active type reflective liquid crystal display device operates in a normally black mode.

In the vertical aligned liquid crystal, when an applied voltage is zero, the long axis of the liquid crystal molecules is aligned in a substantially vertical direction with respect to each substrate surface, and when a voltage is applied, the long axis is aligned in an in-plane direction, thereby the transmittance of the vertically aligned liquid crystal is changed. The direction is a diagonal direction of the pixel electrode (that is, a 45° direction). If the liquid crystal molecules are not aligned in the same direction during drive, the contrast becomes uneven, so in order to prevent this, it is required to align the liquid crystal molecules at a very small pretilt angle in a predetermined direction in advance, and then vertically align them. When the pretilt angle is too large, vertical alignment is degraded, and a black level is increased, thereby the contrast declines. Therefore, in general, the pretilt angle is controlled within a range from 1° to 5° in a diagonal direction of the pixel electrode with respect to the direction of the normal to the substrate surface.

There are two methods of aligning the vertically aligned liquid crystal material, that is, a method of controlling alignment by using an organic alignment film typified by polyimide and rubbing it, and a method of controlling alignment through oblique evaporation by using an inorganic alignment film typified by silicon oxide. Nowadays, in order to achieve higher brightness of a projector, there is a tendency that the power of a lamp is increased to irradiate a display panel with light with very high intensity. Therefore, a problem that the organic alignment film in the former method is degraded due to the light arises.

On the other hand, an obliquely evaporated film of silicon oxide in the latter method is an inorganic material, so unlike polyimide, no degradation in the material due to light occurs, and higher reliability can be achieved. Therefore, the obliquely evaporated film becomes a focus of attention. In the case where the alignment film is the obliquely evaporated film of silicon oxide, the incident angle of evaporation particles to a substrate is changed during oblique evaporation to control the pretilt angle. In general, a practical incident angle is within a range from approximately 45° to 65° with respect to the direction of the normal to a substrate.

A technique of related art of forming the alignment film through oblique evaporation is described in, for example, Japanese Unexamined Patent Application Publication No. 2001-5003.

However, in general, it is difficult to control the alignment of the vertically aligned liquid crystal material. In the case where there is an uneven structure on the drive substrate by the reflective pixel electrode or a groove between pixel electrodes, an alignment defect occurs around the pixel electrode due to the uneven structure. The alignment defect causes a decline in uniformity of characteristics in a display surface, an increase in black level (a phenomenon in which a black portion of an image does not appear black but gray), degradation in image quality due to disclination. In particular, in a reflective liquid crystal display device using a silicon drive device, a pixel pitch is as small as 10 μm or less in general, so compared to a large direct-view-type liquid crystal device with a pixel pitch of a few tens of μm or more, a defective region around a pixel easily exerts an influence upon image quality, and unlike a transmissive liquid crystal display device, the defective region cannot be covered with a black matrix, so a basic practical requirement for the reflective liquid crystal display device is that a misalignment region must be reduced to a minimum or completely eliminated.

A specific problem of the reflective liquid crystal display device of the related art due to pixel electrode structure will be described below. As shown in FIGS. 1A and 1B, reflective pixel electrodes 111 are disposed on a silicon drive substrate 110 in a matrix. The size and the shape of each of the reflective pixel electrodes 111 is, for example, a square 8.4 μm on a side. In order to prevent an electrical short circuit between adjacent pixels, the reflective pixel electrodes 111 are disposed so as to have an inter-pixel spacing W1 with a predetermined distance. When the inter-pixel spacing W1 is, for example, 0.6 μm, a pixel pitch W2 is 9 μm. In general, the pixel pitch W2 is within a range of approximately 7 μm to 15 μm, and the inter-pixel spacing W1 is within a range of approximately 0.3 μm to 0.7 μm. Further, the thickness of the pixel electrode is within a range of approximately 150 nm to 250 nm.

As each of the reflective pixel electrodes 111 has such a shape, a portion with a groove-like shape (hereinafter referred to as inter-pixel groove) is always formed between adjacent pixel electrodes. The inter-pixel groove has, for example, an aspect ratio of 600 nm wide to 150 nm high in a sectional surface shown in FIG. 1B.

FIGS. 2 and 3 schematically show a state where an alignment film 112 of silicon oxide is formed on the pixel structure shown in FIGS. 1A and 1B through oblique evaporation and a state of the alignment of a vertically aligned liquid crystal 113 by the alignment film 112. In FIGS. 2 and 3, an arrow 130 shows an evaporation direction. The alignment film 112 is obliquely evaporated on a substrate at, for example, an incident angle θ of 55° (refer to FIG. 2) with respect to the direction of the normal to a substrate surface from a diagonal direction of the reflective pixel electrodes 111 (refer to FIG. 3).

In the case where such oblique evaporation is performed, as shown in FIG. 2, an area around a side surface of the reflective pixel electrode 111 opposite to the incident direction (around a region 121 in FIG. 2) is shaded with the reflective pixel electrode 111, so the alignment film 112 is not evaporated and formed on the area. On the other hand, the alignment film 112 is formed in the shape of the letter L around a side surface on the other side, as shown in FIG. 2. Thus, the region 121 where no alignment film 112 is formed exists on a bottom surface of the inter-pixel groove and the side surface of the reflective pixel electrode 111.

The alignment direction of a pretilt is a diagonal direction of pixels, and FIG. 3 shows a schematic plan view of a region where the alignment film 112 is formed and the region 121 where the alignment film 112 is not formed in this case. When the thickness of the reflective pixel electrode 111 is increased, and the inter-pixel spacing W1 is reduced, no film is evaporated on the bottom surface of the inter-pixel groove, and the film is formed only on one side surface of the inter-pixel groove. In a typical method of forming an alignment film, it is inevitable that the film structures of both side surfaces of the inter-pixel groove become asymmetric.

Thus, as a region where the alignment film 112 is not formed specifically on the bottom surface of the inter-pixel groove exists, the alignment of the liquid crystal 113 cannot be controlled in the region, thereby the liquid crystal 113 goes out of alignment, and problems such as degradation in image quality such as nonuniform alignment and a decline in reliability arise. In other words, as shown in FIG. 2, the alignment film 112 is formed on a surface of the reflective pixel electrode 111, thereby the long axis of liquid crystal molecules is uniformly aligned in a pretilt direction in a good state in general. On the other hand, specifically the region 121 where the alignment film 112 is not formed is produced in a portion of the bottom surface of the inter-pixel groove, so a force to vertically align the liquid crystal molecules does not work, thereby a nonuniform alignment region 120 is produced. The nonuniform alignment region 120 exerts an influence upon an area around the pixel electrode, thereby resulting in a state where liquid crystal molecules on the surface of the pixel electrode are vertically aligned, but liquid crystal molecules in a region from an area around the pixel electrode to the inter-pixel groove are nonuniformly aligned. Thereby, nonuniform alignment occurs in the region from the area around the pixel electrode to the inter-pixel groove, thereby degradation in image quality is induced. The evaporation angle is generally selected within a range of 45° to 65° with respect to the direction of the normal to the substrate; however, the deeper the inter-pixel groove is, the larger the region where the alignment film 112 is not formed in the bottom surface of the inter-pixel groove becomes, so the evaporation angle has a large influence. The above phenomenon specifically occurs in the case where an obliquely evaporated film of an inorganic material such as silicon oxide is used as the alignment film 112.

On the other hand, in an organic alignment film such as polyimide, the above problems which arise because the alignment film 112 is not formed do not occur. It is because the organic alignment film is formed through coating the whole surface of the pixel substrate with a material in a solvent form by a technique such as spin coating, so the inter-pixel groove is overcoated with the material on average.

A technique proposed in Japanese Unexamined Patent Application Publication No. 2001-5003 is that at first, oblique evaporation is performed at an angle of 70° from the normal to a substrate surface along a side of a pixel electrode to form a first alignment film on a bottom surface portion of an inter-pixel groove along the side of the pixel electrode, and then the substrate is rotated by 90° in a plane, and a second alignment film is formed on a bottom surface portion of the inter-pixel groove along the other side of the pixel electrode through the same oblique evaporation.

According to the technique in Japanese Unexamined Patent Application Publication No. 2001-5003, an alignment film is surely formed on the bottom surface portion of the inter-pixel groove. However, as described above, in the technique, the alignment film cannot be formed on the whole inter-pixel groove to be exact unless evaporation is performed along a side of the pixel electrode, and the substrate is rotated by 90° in a plane to perform evaporation again. However, even if the first alignment film and the second alignment film are formed from different directions by 90° in a plane, a region where no film is formed exists on a side surface of the inter-pixel groove, so asymmetry in the side surfaces of the inter-pixel groove cannot be solved. Therefore, the above burn-in due to ions occurs.

Moreover, in general, in the reflective liquid crystal display device, as a polarization splitting device, a PBS (Polarization Beam Splitter) is used. When polarization is split in a cross Nicol arrangement by the PBS, the alignment direction of a vertical liquid crystal which can obtain the highest transmittance is diagonal to a pixel, that is, a 45° direction. Therefore, in the alignment along the side of the pixel in Japanese Unexamined Patent Application Publication No. 2001-5003, a polarization splitting optical system using the PBS cannot be used in the reflective liquid crystal display device, and the reflective liquid crystal display device has little practicability specifically as a projection display unit. In order to avoid the problem, when the second alignment film is formed on a direction diagonal to the pixel, in principle, even if the first alignment film is formed from any direction, a region which cannot be fully covered exists in the inter-pixel groove, so effects of the technique in Japanese Unexamined Patent Application Publication No. 2001-5003 are not exerted. Therefore, the technique is far from practically effective.

SUMMARY OF THE INVENTION

In view of the foregoing, it is an object of the invention to provide a reflective liquid crystal display device capable of preventing burn-in in a long-term drive which occurs due to structural asymmetry in side surface portions of a inter-pixel groove to achieve long-term drive reliability, and a method of manufacturing the same, and a liquid crystal display unit.

A reflective liquid crystal display device according to the invention comprises a pixel electrode substrate and a transparent electrode substrate facing each other with a vertically aligned liquid crystal in between, wherein the pixel electrode substrate includes: a plurality of reflective pixel electrodes; a first obliquely evaporated alignment film formed through evaporation from a first oblique evaporation direction with respect to a substrate surface of the pixel electrode substrate after forming the pixel electrodes; and a second obliquely evaporated alignment film formed through evaporation from a second oblique evaporation direction with respect to the substrate surface of the pixel electrode substrate after forming the first obliquely evaporated alignment film. The first obliquely evaporated alignment film is formed on the whole top surfaces of the pixel electrodes and a first side surface of a groove portion between adjacent pixel electrodes in a sectional surface of the pixel electrode substrate in a thickness direction through evaporation, and the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation.

A liquid crystal display unit according to the invention displays an image by using light modulated by the reflective liquid crystal display device according to the invention.

In a method of manufacturing a reflective liquid crystal display device according to the invention, the reflective liquid crystal display device comprises a pixel electrode substrate including a plurality of reflective pixel electrodes and a transparent electrode substrate including a transparent electrode which face each other with a vertically aligned liquid crystal in between, and the method comprises the steps of forming a first obliquely evaporated alignment film through evaporation from a first oblique evaporation direction with respect to a substrate surface of the pixel electrode substrate after forming the pixel electrodes; and forming a second obliquely evaporated alignment film through evaporation from a second oblique evaporation direction with respect to the substrate surface of the pixel electrode substrate after forming the first obliquely evaporated alignment film. In the step of forming the first obliquely evaporated alignment film, the first obliquely evaporated alignment film is formed on the whole top surfaces of the pixel electrodes and a first side surface of a groove portion between adjacent pixel electrodes in a sectional surface of the pixel electrode substrate in a thickness direction through evaporation, and in the step of forming the second obliquely evaporated alignment film, the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation.

In the reflective liquid crystal display device, the method of manufacturing the same and the liquid crystal display unit according to the invention, for example, evaporated films of silicon oxide are formed as the first obliquely evaporated alignment film and the second obliquely evaporated alignment film.

In the reflective liquid crystal display device, the method of manufacturing the same, and the liquid crystal display unit according to the invention, the first obliquely evaporated alignment film is formed on the first side surface of a groove portion (inter-pixel groove) between adjacent pixel electrodes in the sectional surface of the pixel electrode substrate in a thickness direction through evaporation, and the second obliquely evaporated alignment film is formed on the second side surface facing the first side surface through evaporation. Thereby, the film structures of both side surfaces of the inter-pixel groove in the sectional surface become symmetric, so burn-in in a long-term drive which occurs due to an asymmetric structure can be prevented.

In the reflective liquid crystal display device, the method of manufacturing the same and the liquid crystal display unit according to the invention, a vertically evaporated film may be formed on the whole top surfaces of the pixel electrodes and the whole bottom surface of the groove portion between the adjacent pixel electrodes through evaporation from a vertical direction with respect to the substrate surface of the pixel electrode substrate. In this case, after forming the vertically evaporated film, the first obliquely evaporated alignment film and the second obliquely evaporated alignment film are laminated on the vertically evaporated film.

When a film is formed through only oblique evaporation, a region where an evaporated film is not formed specifically in the bottom surface of the inter-pixel groove may exist. However, through vertical evaporation, a film is formed on the whole bottom surface of the inter-pixel groove. In a region where an obliquely evaporated alignment film is not formed in the inter-pixel groove, a liquid crystal is not vertically aligned and out of alignment, so the region has an adverse effect on the alignment of the vertically aligned liquid crystal on the pixel electrode. On the other hand, in the case where the vertically evaporated film is formed as a base film, in the region, the liquid crystal is aligned in a vertical direction by the vertically evaporated film, so the region hardly has an adverse effect on the vertical alignment of the liquid crystal on the pixel electrode. The alignment of the liquid crystal by the obliquely evaporated alignment film is slightly different from the alignment of the liquid crystal by the vertically evaporated film, because the alignment by the obliquely evaporated alignment film has a pretilt angle. However, in general, the pretilt angle is as small as 1° to 5°, so there is no discernible difference between the alignments as display image quality. Therefore, in the case where the vertically evaporated film is formed as the base film, misalignment does not occur around the inter-pixel groove, so stable vertical alignment can be achieved throughout the display region. Thereby, superior image quality can be achieved.

Thus, in the reflective liquid crystal display device according to the invention, a plurality of evaporated films are laminated. In the manufacturing steps, it is preferable that the evaporated films are successively formed. The word "successively" herein means that without breaking vacuum, the films are formed in sequence. A method of forming each evaporated film with a different apparatus, or a method in which after forming one evaporated film, the vacuum is broken, and then another evaporated film is formed can be used, thereby effects to some extent can be obtained. However, in this case, it is required to keep interfaces between the evaporated films extremely clean. More specifically, for example, silicon oxide is susceptible to water absorption or adhesion of impurities, so chemical stability in the surface of each evaporated film is important. If the chemical stability is not sufficient, the bonding strength between the films is low, so the films may be separated, or the film structures may not be continuously connected, thereby ions or like are trapped in the interfaces, thereby new burn-in may occur.

Therefore, for example, a method of using one evaporation apparatus including a system in which the incident angle of the evaporation particles in the substrate surface or the incident angle of the evaporation particles with respect to the direction of the normal to the substrate can be changed so as to successively form the evaporated films without breaking the vacuum is the most effective, and the method is extremely desired as an efficient manufacturing method.

In the reflective liquid crystal display device and the liquid crystal display unit according to the invention, the first obliquely evaporated alignment film is formed on the first side surface of the groove portion between the adjacent pixel electrodes in the sectional surface of the pixel electrode substrate in a thickness direction through evaporation, and the second obliquely evaporated alignment film is formed on the second side surface facing the first side surface through evaporation, so the film structures of both side surfaces of the inter-pixel groove in the sectional surface become symmetric, thereby burn-in in a long-term drive which occurs due to the asymmetric structure can be prevented, and long-term drive reliability can be achieved.

Specifically, in the liquid crystal display unit according to the invention, the reflective liquid crystal display device of the invention is used to display an image, so an image with superior image quality can be displayed.

The method of manufacturing a reflective liquid crystal display device according to the invention comprises the steps of forming the first obliquely evaporated alignment film through evaporation from the first oblique evaporation direction with respect to the substrate surface of the pixel electrode substrate after forming the pixel electrodes; and forming the second obliquely evaporated alignment film through evaporation from the second oblique evaporation direction with respect to the substrate surface of the pixel electrode substrate after forming the first obliquely evaporated alignment film, and the first obliquely evaporated alignment film is formed on the whole top surfaces of the pixel electrodes and the first side surface of the groove portion between the adjacent pixel electrodes in the sectional surface of the pixel electrode substrate in a thickness direction through evaporation, and the second obliquely evaporated alignment film is formed on the second side surface facing the first side surface, so the film structures of both side surfaces of the inter-pixel groove in the sectional surface can be symmetric. Thereby, the reflective liquid crystal display device capable of preventing burn-in in a long-term drive which occurs due to the asymmetric structures of both side surfaces of the inter-pixel groove and achieving long-term drive reliability can be manufactured.

Specifically, in the case where the vertically evaporated film is formed from a vertical direction with respect to the substrate surface of the pixel electrode substrate, and after forming the vertically evaporated film, the first obliquely evaporated alignment film and the second obliquely evaporated alignment film are laminated thereon, the vertically evaporated film is formed on the whole bottom surface of the inter-pixel groove through evaporation, so even if a region where the first obliquely evaporated alignment film and the second obliquely evaporated alignment film are not formed exists in the bottom surface of the inter-pixel groove, in the region, the liquid crystal is aligned in a vertical direction by the vertically evaporated film. Thereby, in the case where the alignment of the vertically aligned liquid crystal is controlled by the obliquely evaporated alignment film, misalignment and nonuniform alignment due to the structure of the inter-pixel groove can be prevented, and superior image quality can be achieved.

Other and further objects, features and advantages of the invention will appear more fully from the following description.

BRIEF DESCRIPTION OF THE DRAWINGS

These and other objects and features of the present invention will become clear from the following description of the preferred embodiments given with reference to the accompanying drawings, in which:

FIGS. 11A through 11C are illustrations for describing steps of forming an obliquely evaporated alignment film;

FIGS. 12A and 12B are illustrations showing steps of forming the obliquely evaporated alignment film together with an evaporation apparatus;

FIGS. 13A through 13C are illustrations showing steps of forming a vertically evaporated film and the obliquely evaporated alignment film together with an evaporation apparatus;

FIG. 15 is a table showing results of observing the occurrence of a burn-in phenomenon in an inter-pixel groove of the reflective liquid crystal display device according to the embodiment of the invention and an inter-pixel groove of a reflective liquid crystal display device of the related art.

DETAILED DESCRIPTION OF THE PREFERRED EMBODIMENTS

Before describing an embodiment of the present invention, a new problem that the applicant of the present invention has discovered by study will be described.

Figure 1:
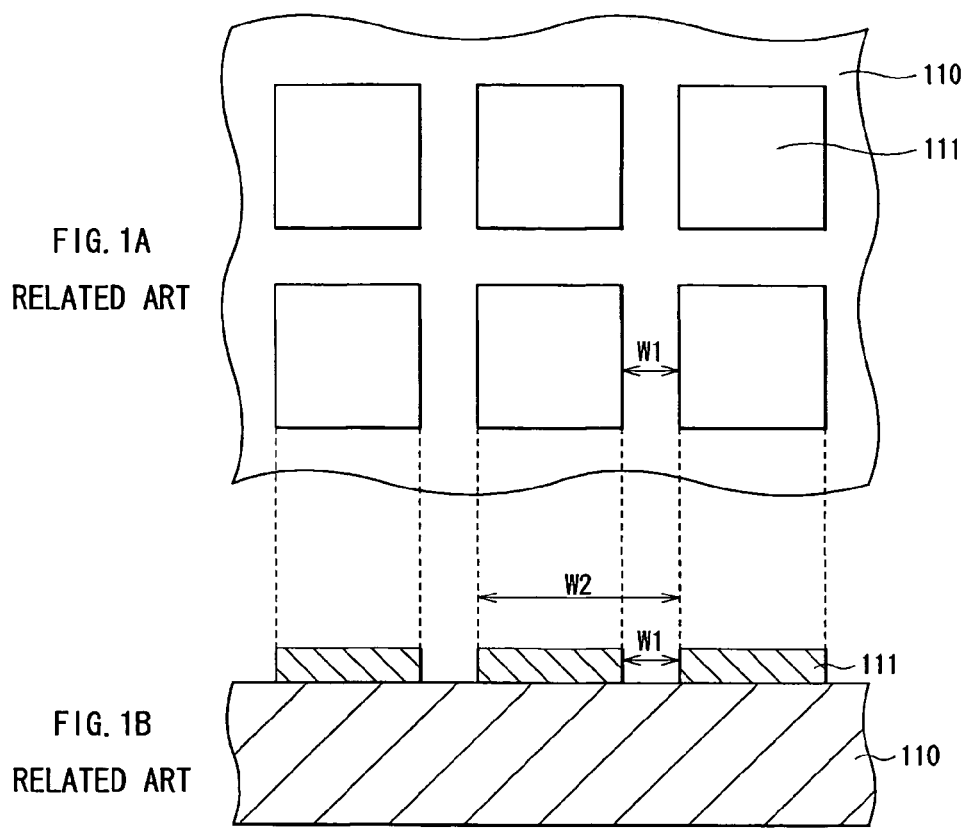
FIGS. 1A and 1B are a plan view and a sectional view of a reflective liquid crystal display device of the related art on a pixel electrode substrate side.
Figure 2:
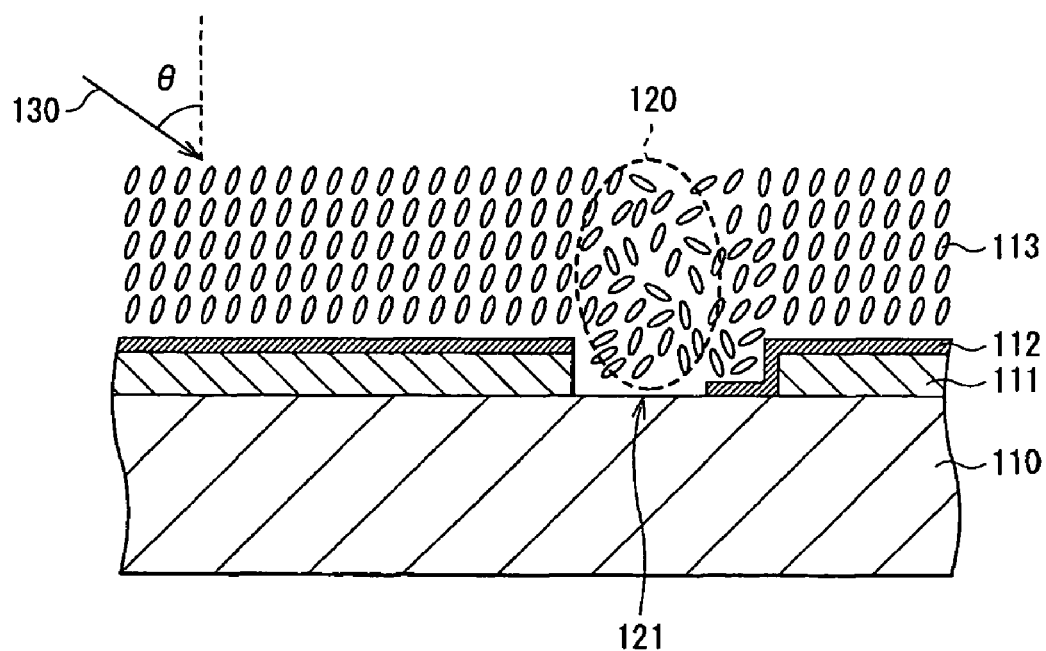
FIG. 2 is a sectional view for describing a problem due to misalignment occurring in the reflective liquid crystal display device of the related art.
Figure 3:
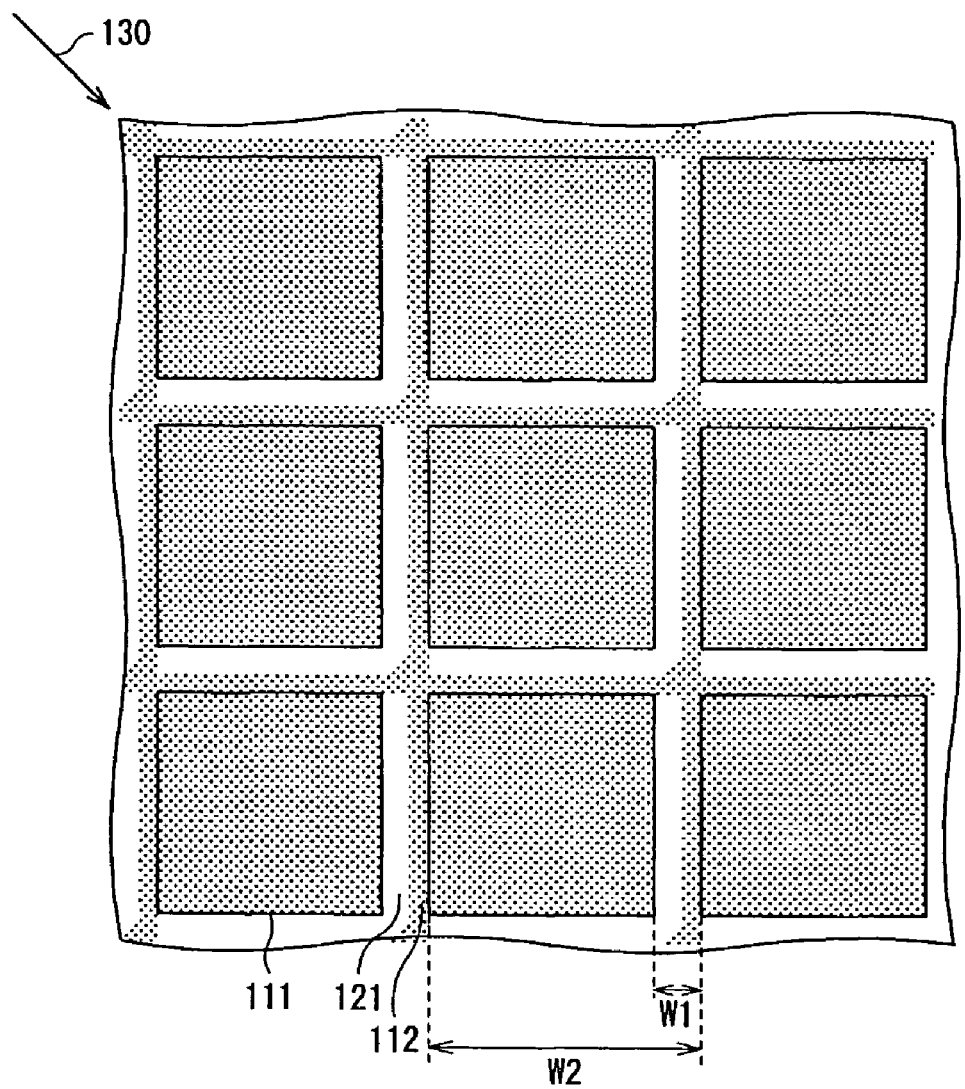
FIG. 3 is a plan view for describing the problem due to misalignment occurring in the reflective liquid crystal display device of the related art.
Figure 4:
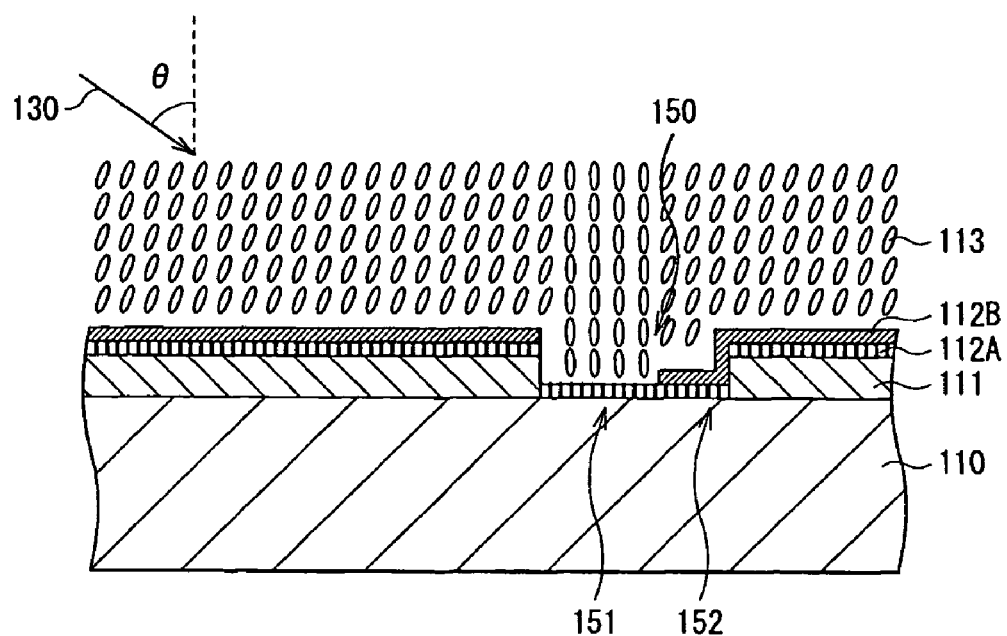
FIG. 4 is a sectional view of an example of a film structure for solving the problem due to the misalignment occurring in the reflective liquid crystal display device.

In order to prevent the problems such as uneven alignment as shown in FIG. 2 which occur because the alignment film 112 is not formed specifically on the bottom surface of the inter-pixel groove, the applicant of the invention has proposed a film structure shown in FIG. 4 (refer to Japanese Patent Application No. 2003-309875).

In the film structure, before forming an obliquely evaporated alignment film 112B, a base film of a vertically evaporated film 112A is formed from a vertical direction with respect to a substrate surface of a pixel electrode substrate in advance. The obliquely evaporated alignment film 112B is evaporated from an oblique direction with respect to the substrate surface, so the obliquely evaporate alignment film 112B is formed on the whole top surface of the reflective pixel electrode 111 and a region 152 on a side of an inter-pixel groove 150 with the vertically evaporated film 112A in between. In a region 151 on the other side of the inter-pixel groove 150 where the obliquely evaporated alignment film 112B is not formed, the vertically evaporated film 112A comes in contact with the liquid crystal, so compared to the structure shown in FIG. 2, problems such as nonuniform alignment can be prevented.

However, in such a film structure, a region where the alignment film is not formed still exists on a side surface of the inter-pixel groove 150 (a side surface of the reflective pixel electrode 111), so structural asymmetry in the film structure of the inter-pixel groove 150 cannot be solved. A problem due to the asymmetry will be described below.

Figure 5:
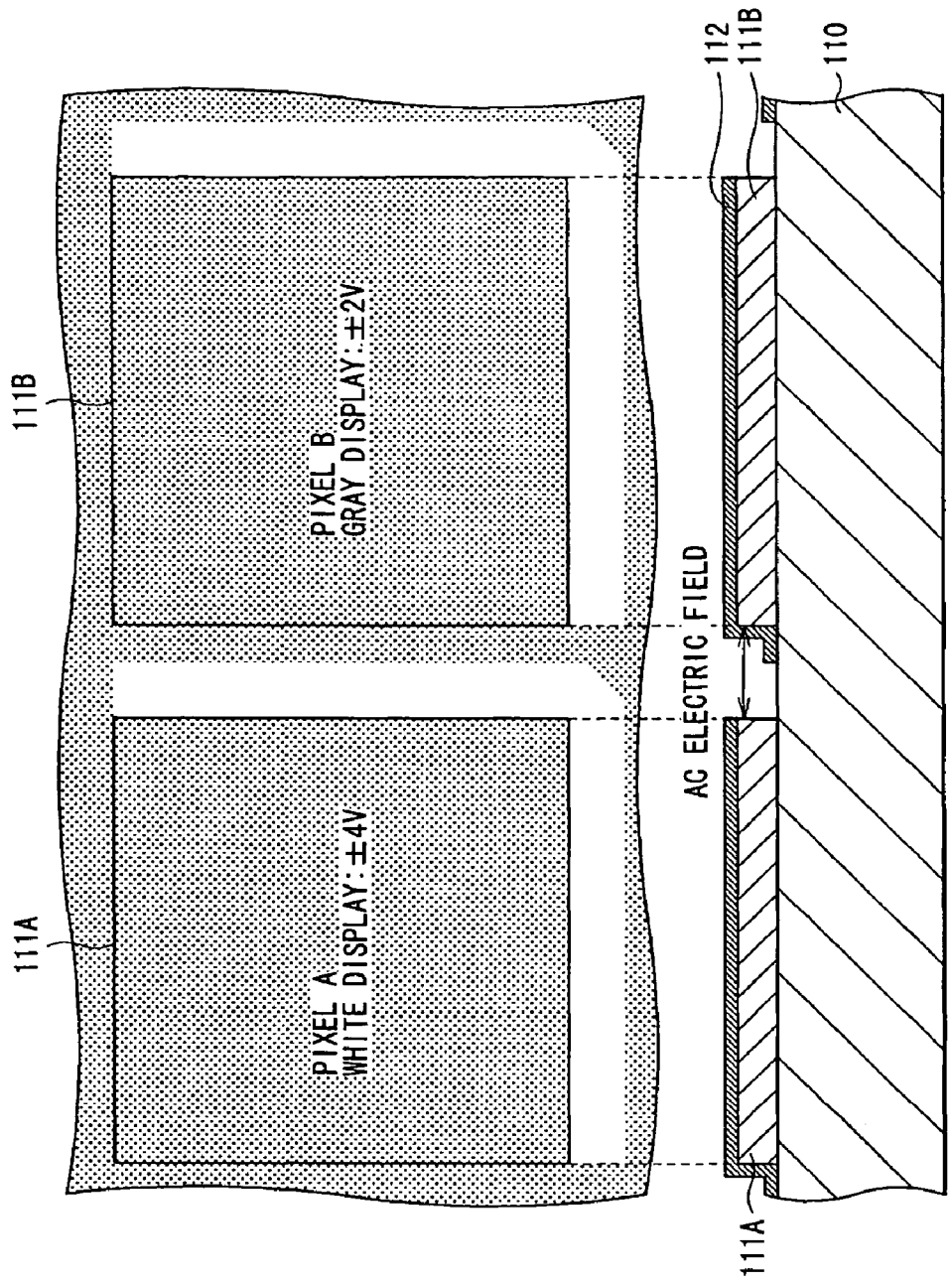
FIGS. 5A and 5B are a plan view and a sectional view for describing a problem due to asymmetry in the film structure of the reflective liquid crystal display device.

As shown in FIGS. 5A and 5B, in the case where adjacent pixels A and B are displayed as white and gray, which are different gray levels, adjacent pixel electrodes 111A and 111B corresponding to the pixels A and B are driven by different voltages corresponding to white and gray.

Figure 6:
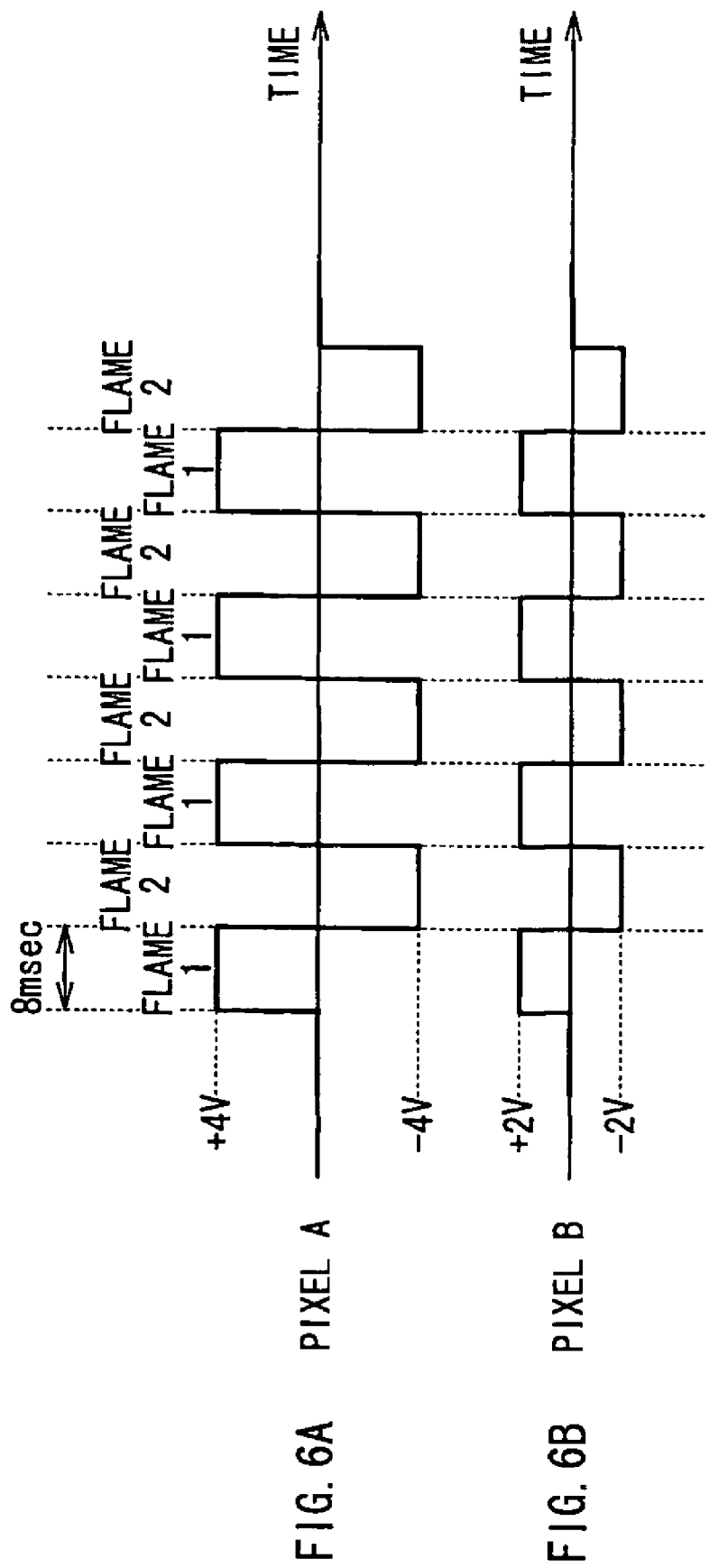
FIGS. 6A and 6B are illustrations of drive waveforms for describing the problem due to asymmetry in the film structure of the reflective liquid crystal display device.

FIGS. 6A and 6B show examples of drive voltage waveforms. For example, a drive voltage applied in the case where a pixel is displayed as white is ±4 V (refer to FIG. 6A) and a drive voltage applied in the case where a pixel is displayed as gray is ±2 V (refer to FIG. 6B). In the case of driving a liquid crystal display device, in a reflective liquid crystal display device, a lateral electric field is generally inhibited, so frame inversion in which a driving frequency is doubled to reverse the polarity of voltage for each frame is used. For example, as shown in FIGS. 6A and 6B, in a frame 1, a state where the drive voltage of the pixel A is +4 V, and the drive voltage of the pixel B adjacent to the pixel A is +2 V continues, for example, for 8 msec, and in the next frame 2, the polarity is reversed, so a state where the drive voltage of the pixel A is −4 V, and the drive voltage of the pixel B is −2 V continues for 8 msec. The actions in the frames 1 and 2 are repeated.

In the frame 1, the drive voltage of the pixel A is +4 V, and the drive voltage of the adjacent pixel B is +2 V for 8 msec, so a potential difference of 2 V between the adjacent pixel electrodes 111A and 111B occurs, thereby an electric field is generated in a lateral direction from the pixel electrode 111A to the pixel electrode 111B through the inter-pixel groove. Next, in the frame 2, the drive voltage of the pixel A is −4 V, and the drive voltage of the adjacent pixel B is −2 V, so a potential difference is 2 V; however the direction of the electric field is opposite to that in the frame 1, so an electric field is generated from the pixel electrode 111B to the pixel electrode 111A.

Thus, in the case where adjacent pixels A and B are displayed as different gray levels, a plus or minus voltage, that is, an AC (alternating current) potential is applied to each frame in a side surface direction of the inter-pixel groove. The magnitudes of the plus voltage and the minus voltage are the same, so basically the applied voltages balance each other out, so a temporal average value will be zero.

However, as described above, the device using the obliquely evaporated alignment film of silicon oxide has an asymmetric structure in which the evaporated film is not formed on one side surface of the inter-pixel groove, so the following problem arises. In a period of 8 msec per frame, a DC (direct-current) potential is applied between pixels; however, in the period, dielectric polarization occurs in an inter-pixel groove portion. The polarization differs depending upon each frame, because the film structure of the inter-pixel groove is asymmetric. Therefore, even if the magnitude of the applied voltage is the same, the amount of dielectric polarization slightly differs depending upon each frame, so in an experiment by the inventers of the present invention, when the device is driven for a long period of time, a problem that a DC potential is generated on both ends of the inter-pixel groove has been observed. When the DC potential exists, in the case where the device is driven for a long period of time to provide different gray levels, in an inter-pixel groove between display pixels of different gray levels, a DC voltage is generated on one side of the inter-pixel groove. Therefore, a problem that ions in liquid crystal cells are gathered in a portion where the DC voltage is generated, thereby resulting in burn-in arises.

It is because silicon oxide has relatively low resistivity and a small capacity, so polarization occurs even in a relatively short period of time such as 8 msec. The polarization is dependent to the structure of the inter-pixel groove. In other words, it is considered that in a device using a obliquely evaporated film of the related art, the inter-pixel groove has an asymmetric structure, so the above phenomenon occurs. Specifically, it is considered that when the film structures of the side surfaces of adjacent pixel electrodes are asymmetric, the above phenomenon easily occurs. The present invention can solve the asymmetry of the film structures.

A preferred embodiment of the present invention will be described in more detail below referring to the accompanying drawings.

<Description of Reflective Liquid Crystal Display Device>

Figure 7:
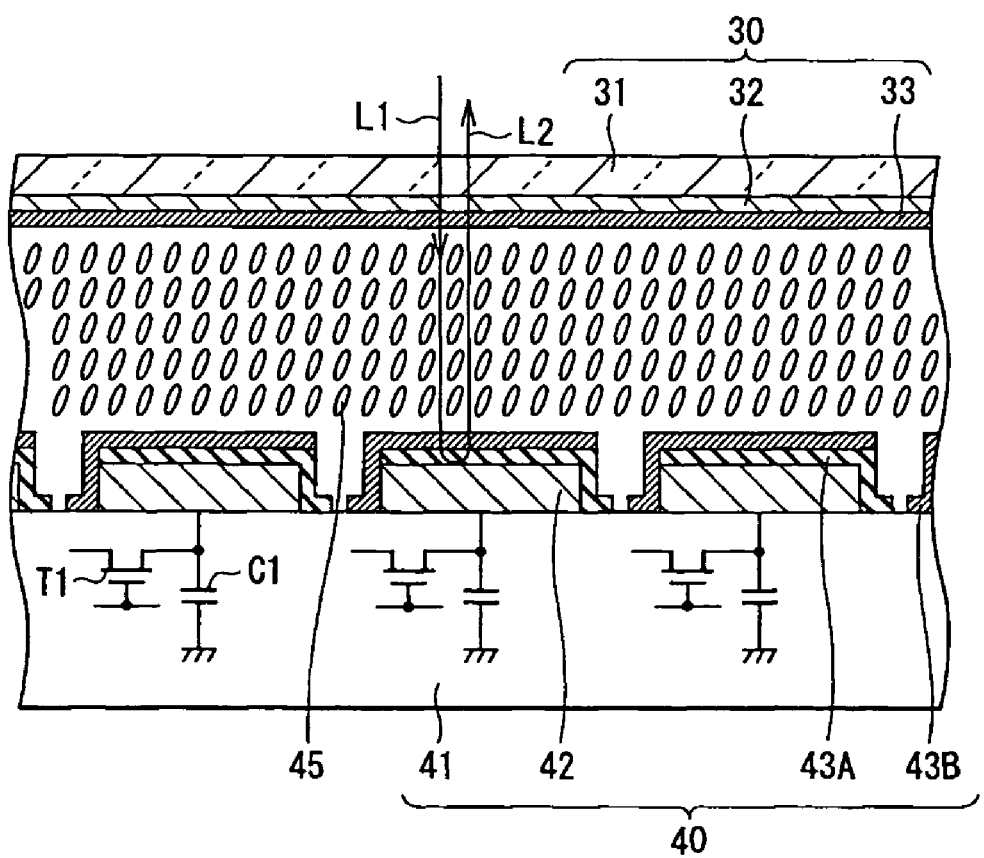
FIG. 7 is a sectional view of the whole structure of a reflective liquid crystal display device according to an embodiment of the invention.

FIG. 7 shows the whole structure of a reflective liquid crystal display device according to an embodiment of the invention. The reflective liquid crystal display device comprises a transparent electrode substrate 30 and a pixel electrode substrate 40 which face each other, and a vertically aligned liquid crystal 45 injected between these substrates 30 and 40.

The transparent electrode substrate 30 includes a glass substrate 31, and a transparent electrode 32 laminated on a surface of the glass substrate 31 on a side closer to the vertically aligned liquid crystal 45 (on a surface facing the pixel electrode substrate 40). An obliquely evaporated alignment film 33 is laminated on the whole surface of the transparent electrode 32 on a side closer to the vertically aligned liquid crystal 45. As the transparent electrode 32, an electrode material with a function of transmitting light, generally ITO (Indium Tin Oxide) which is a solid solution material of tin oxide ($SnO_2$) and indium oxide ($In_2O_3$) is used. A common potential (for example, a ground potential) is applied to the transparent electrode 32 in the whole pixel region.

As the obliquely evaporated alignment film 33, for example, an obliquely evaporated film of, for example, silicon oxide typified by silicon dioxide ($SiO_2$) is used. In this case, the pretilt angle of the vertically aligned liquid crystal 45 is controlled by changing the evaporation angle during oblique evaporation. In general, the evaporation angle θ is approximately 45° to 65° with respect to the direction of the normal to a substrate.

The pixel electrode substrate 40 includes, for example, a single-crystal silicon substrate 41, and a reflective pixel electrode 42, a first obliquely evaporated alignment film 43A and a second obliquely evaporated alignment film 43B which are laminated in order on a surface of the silicon substrate 41 on a side closer to the vertically aligned liquid crystal 45 (a surface facing the transparent electrode substrate 30). In the silicon substrate 41, an active drive circuit including a transistor T1 such as CMOS or NMOS and a capacitor (auxiliary capacitor) C1 is formed.

A plurality of the reflective pixel electrodes 42 are formed in a matrix on the silicon substrate 41. Each of the reflective pixel electrodes 42 is made of a metal film typified by aluminum (Al) or silver (Ag). In the case where a metal electrode such as an aluminum electrode is used as the reflective pixel electrode 42, the reflective pixel electrode 42 has a function as a light reflective film and a function as an electrode which applies an voltage to a liquid crystal, and in order to further increase reflectivity, a reflective layer of a multilayer film such as a dielectric mirror may be formed on the aluminum electrode or the like. Moreover, a film of an oxide or a nitride may be laid over the aluminum electrode or the like so as to protect the whole surface of the aluminum electrode or the like.

Figure 9:
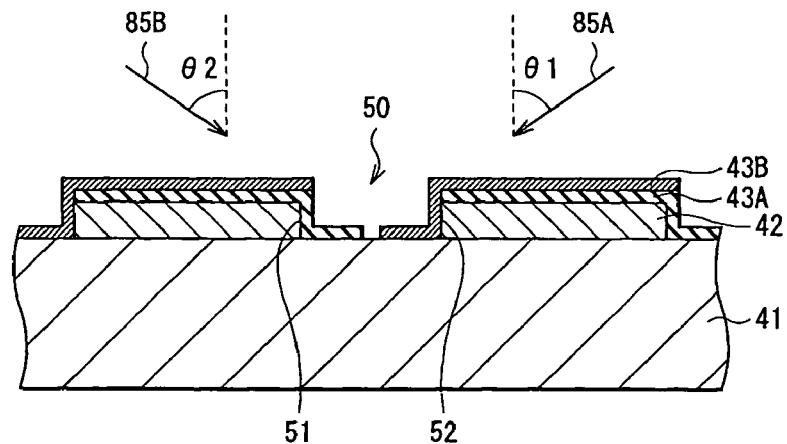
FIG. 9 is a schematic sectional view of the structure of the reflective liquid crystal display device shown in FIG. 7 around an inter-pixel groove.

FIG. 9 schematically shows the structure of the pixel electrode substrate 40 around an inter-pixel groove (a groove portion between adjacent pixel electrodes) 50. In FIG. 9, a first oblique evaporation direction 85A and a second oblique evaporation direction 85B indicated by arrows show evaporation directions where a first obliquely evaporated alignment film 43A and a second obliquely evaporated alignment film 43B are evaporated, respectively.

The first obliquely evaporated alignment film 43A is formed through evaporation from the first oblique evaporation direction 85A with respect to a substrate surface of the pixel electrode substrate 40. The first obliquely evaporated alignment film 43A is formed on the whole top surfaces of the reflective pixel electrodes 42 and an area around a first side surface 51 of the inter-pixel groove 50 in a sectional surface of the pixel electrode substrate 40 shown in FIG. 9 in a thickness direction through evaporation. As shown in FIG. 9, the first obliquely evaporated alignment film 43A is also formed on a bottom surface portion of the inter-pixel groove 50 on a side closer to the first side surface 51 according to an evaporation angle θ.

The second obliquely evaporated alignment film 43B is formed after forming the first obliquely evaporated alignment film 43A. The second obliquely evaporated alignment film 43B is formed on the whole top surfaces of the reflective pixel electrodes 42 with the first obliquely evaporated alignment film 43A in between and an area around a second side surface 52 of the inter-pixel groove 50 which faces the first side surface 51 in the sectional surface of the pixel electrode substrate 40 shown in FIG. 9 in a thickness direction through evaporation. As shown in FIG. 9, the second obliquely evaporated alignment film 43B is formed on a bottom surface portion of the inter-pixel groove 50 on a side closer to the second side surface 52 according to an evaporation angle θ2.

It is preferable that the evaporation direction 85A of the first obliquely evaporated alignment film 43A and the evaporation direction 85B of the second obliquely evaporated alignment film 43B are substantially symmetric through a manufacturing method which will be described later. Thereby, the film structure in the inter-pixel groove 50 becomes substantially symmetric. Thus, the most characteristic portion of the embodiment is that the first obliquely evaporated alignment film 43A and the second obliquely evaporated alignment film 43B are symmetrically formed on not only the top surfaces of the reflective pixel electrodes 42 but also the side surfaces 51 and 52 of the inter-pixel groove 50 through oblique evaporation from two different and symmetric evaporation directions 85A and 85B.

Figure 10A:
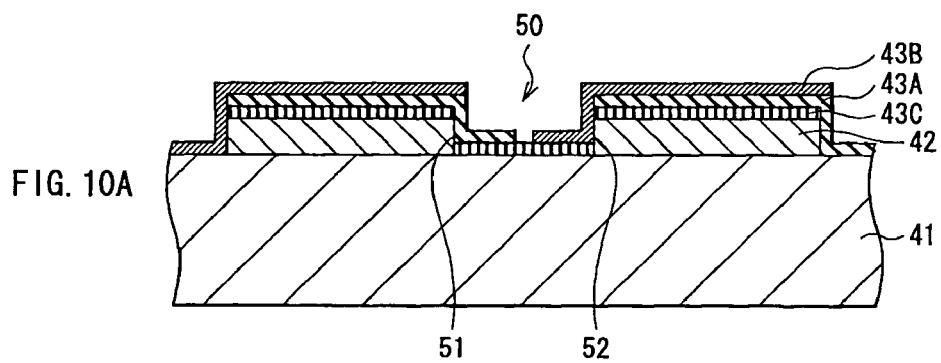
FIGS. 10A and 10B are sectional views showing other examples of a pixel electrode substrate.

As shown in FIG. 10A, before forming the first obliquely evaporated alignment film 43A and the second obliquely evaporated alignment film 43B, a vertically evaporated film 43C as a base film may be formed from a vertical direction with respect to the substrate surface of the pixel electrode substrate 40 through evaporation. The vertically evaporated film 43C is laminated on the whole top surfaces of the reflective pixel electrodes 42 and the whole bottom surface of the inter-pixel groove 50 through evaporation from a vertical direction.

As the first obliquely evaporated alignment film 43A, the second obliquely evaporated alignment film 43B and the vertically evaporated film 43C, as in the case of the obliquely evaporated alignment film 33 on the side of the transparent electrode substrate 30, for example, evaporated films of, for example, silicon oxide typified by silicon dioxide ($SiO_2$) are used. On the reflective pixel electrodes 42, the second obliquely evaporated alignment film 43B comes into contact with the vertically aligned liquid crystal 45, so when the evaporation angle θ2 during oblique evaporation of the second obliquely evaporated alignment film 43B is changed, the pretilt angle of the vertically aligned liquid crystal 45 on the reflective pixel electrodes 42 is controlled. In general, the evaporation angle θ2 is approximately 45° to 65° with respect to the direction of the normal to the substrate.

In the vertically aligned liquid crystal 45 used in the reflective liquid crystal display device, the long axis of the molecules of the vertically aligned liquid crystal 45 is aligned in a substantially vertical direction with respect to each substrate surface when an applied voltage is zero, and when a voltage is applied, the long axis is inclined in a in-plane direction, thereby the transmittance of the vertically aligned liquid crystal 45 changes. If the directions where the liquid crystal molecules are inclined are not uniform during drive, the contrast becomes uneven. In order to prevent uneven contrast, it is required to align liquid crystal molecules at a very small pretilt angle in a predetermined direction (in a diagonal direction of a device, in general) in advance, then vertically align them. When the pretilt angle is too large, vertical alignment is degraded, thereby a black level is increased, and the contrast declines. Therefore, in general, the pretilt angle is controlled within a range from approximately 1° to 5° by the obliquely evaporated alignment film 33 and the second obliquely evaporated alignment film 43B.

Figure 8:
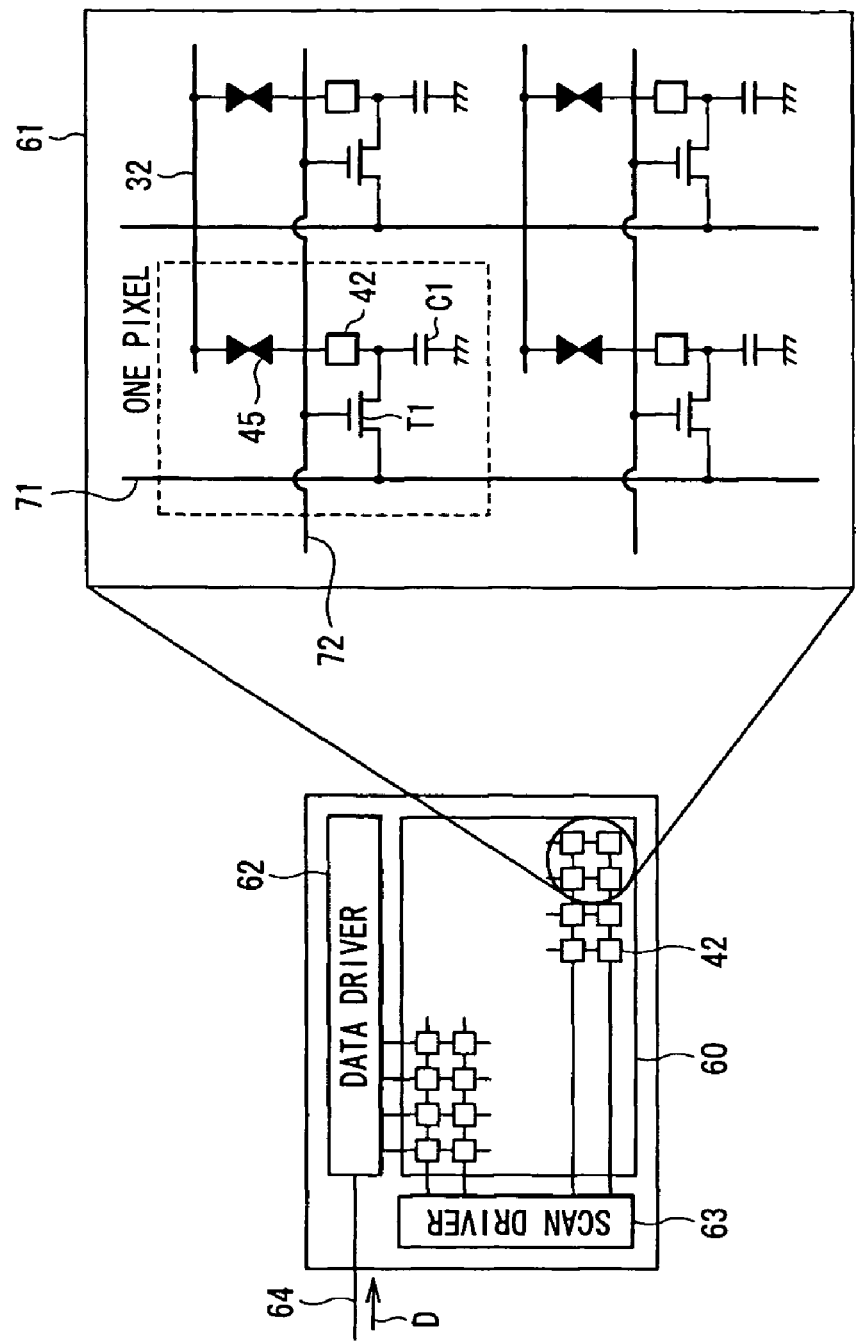
FIG. 8 is an illustration showing the structure of a drive circuit of the reflective liquid crystal display device according to the embodiment of the invention.

FIG. 8 shows the structure of a drive portion of the reflective liquid crystal display device. The drive portion includes a pixel drive circuit 61 formed in each pixel and a logic portion such as a data driver 62 and a scan driver 63 which is disposed around a display region 60. Image signals D from outside are inputted into the data driver 62 through a signal line 64. The pixel drive circuit 61 is formed under each reflective pixel electrode 42, and includes a switching transistor T1 and the auxiliary capacitor C1 which supplies a voltage to the liquid crystal. The transistor T1 is required to have a withstand voltage corresponding to a drive voltage of the vertically aligned liquid crystal 45, so in general, the transistor T1 is formed by a higher withstand voltage process than the logic portion.

In the pixel drive circuit 61, a plurality of data lines 71 are arranged in a column direction and a plurality of scanning lines 72 are arranged in a line direction. An intersection of each data line 71 and each scanning line 72 corresponds to one pixel. A source electrode of each transistor T1 is connected to the data line 71, and a gate electrode of the transistor T1 is connected to the scanning line 72. A drain electrode of each transistor T1 is connected to each reflective pixel electrode 42 and the auxiliary capacitor C1. Each data line 71 is connected to the data driver 62, and image signals are supplied from the data driver 62. Each scanning line 72 is connected to the scan driver 63, and scanning signals are successively supplied from the scan driver 63.

Next, a method of manufacturing the reflective liquid crystal display device will be described below. A characteristic portion of the reflective liquid crystal display device is the structures of the first obliquely evaporated alignment film 43A and the second obliquely evaporated alignment film 43B in the pixel electrode substrate 40, so specifically a method of forming them will be described in detail.

A method of forming the first obliquely evaporated alignment film 43A and the second obliquely evaporated alignment film 43B will be described below referring to FIGS. 11A through 11C, 12A and 12B. FIGS. 12A and 12B show a vacuum evaporation apparatus used for forming them. In each drawing, a symbol "1" in the pixel electrode substrate 40 is provided so as to see the direction of rotation of the pixel electrode substrate 40 in a plane for convenience of the description. After the reflective pixel electrode 42 formed on the silicon substrate 41 as the pixel electrode substrate 40 is cleaned, the pixel electrode substrate 40 is introduced into the vacuum evaporation apparatus 80. The reflective pixel electrode 42 is formed, for example, through forming a metal film such as aluminum on the silicon substrate 41, and then processing the metal film on the silicon substrate 41 into a square by using a photolithography technique in a semiconductor process.

As the vacuum evaporation apparatus 80, a vacuum evaporation apparatus including, for example, a substrate rotation system which can change the incident angle of evaporation particles 83 with respect to the direction of the normal to the substrate or the incident direction of the evaporation particles 83 in the substrate surface is used. During film formation, vacuum is maintained in the vacuum evaporation apparatus 80.

In the vacuum evaporation apparatus 80 including such a substrate rotation system, at first, the first obliquely evaporation alignment film 43A is formed through evaporation from the first oblique evaporation direction 85A obliquely inclined in the plane with respect to the substrate surface of the pixel electrode substrate 40. In this case, the incident direction in the plane is 180° different from the original alignment direction of the vertically aligned liquid crystal 45 (refer to FIGS. 11A and 12A). The pixel electrode substrate 40 is rotated by the angle $\theta 1$ in a sectional surface direction so that the incident angle of the evaporation particles 83 becomes a predetermined angle $\theta 1$ (refer to FIG. 9) with respect to the direction of the normal to the substrate surface. As the evaporation particles 83, for example, silicon oxide is used. Thereby, at first, the first obliquely evaporated alignment film 43A of silicon oxide is obliquely evaporated at, for example, an incident angle $\theta 1$ of 45° to 65° with respect to the direction of the normal to the substrate surface from the first oblique evaporation direction 85A which is 180° different from the original alignment direction of the vertically aligned liquid crystal 45. The first obliquely evaporated alignment film 43A is evaporated from an oblique direction with respect to the substrate surface, so as shown in FIG. 9, the first obliquely evaporated alignment film 43A is formed on the whole top surfaces of the reflective pixel electrodes 42 and an area of the inter-pixel groove 50 around the first side surface 51.

After that, in the state where vacuum is maintained, the pixel electrode substrate 40 is rotated by 180° in the plane (refer to FIG. 11B), and the second obliquely evaporated alignment film 43B is formed through evaporation from the second oblique evaporation direction 85B obliquely inclined in the plane with respect to the substrate surface (the diagonal direction of the square reflective pixel electrodes 42 in the embodiment). In this case, the pixel electrode substrate 40 is rotated by 180° from the state where the first obliquely evaporated alignment film 43A is formed in the plane, so the incident direction in the plane is shifted to the original alignment direction of the vertically aligned liquid crystal 45 (FIGS. 11C and 12B). The incident angle $\theta 2$ in a sectional surface direction of the pixel electrode substrate 40 is the same as the incident angle $\theta 1$ when forming the first obliquely evaporated alignment film 43A. The pixel electrode substrate 40 is already inclined at the incident angle $\theta 1$ when forming the first obliquely evaporated alignment film 43A, so when evaporation is performed in the state where the pixel electrode substrate 40 is rotated by 180° in the plane, oblique evaporation is performed at the incident angle $\theta 2$ (=$\theta 1$) in the sectional direction of the pixel electrode substrate 40. As an evaporation source 81, the same source as that used when the first obliquely evaporated alignment film 43A is formed, and as the evaporation particles 83, as in the case of the first obliquely evaporated alignment film 43A, for example, silicon oxide is used. Thus, the second obliquely evaporated alignment film 43B is obliquely evaporated at, for example, an incident angle $\theta 2$ of 45° to 65° with respect to the direction of the normal to the substrate surface. As in the case of a method of the related art, it is designed that the incident angle in the plane is the diagonal direction of the pixel, and the pretilt angle of liquid crystal molecules is approximately 1° to 5°.

The second obliquely evaporated alignment film 43B is obliquely evaporated from a direction which is 180° different from the direction where the first obliquely evaporated alignment film 43A is formed in the plane with respect to the substrate surface, so the second obliquely evaporated alignment film 43B is formed on the whole top surfaces of the reflective pixel electrodes 42 with the first obliquely evaporated alignment film 43A in between and an area of the inter-pixel groove 50 around the second side surface 52 which faces the first side surface 51. Thereby, the film structures of both side surfaces of the inter-pixel groove 50 in the sectional surface become symmetric.

It is preferable that the evaporation angle θ1 of the first obliquely evaporated alignment film 43A and the evaporation angle θ2 of the second obliquely evaporated alignment film 43B in the sectional surface of the pixel electrode substrate 40 are fully the same so as to maintain symmetry in the film structure of the inter-pixel groove 50. However, it is considered that asymmetry between the structures of both side surfaces of the inter-pixel groove 50 is a main cause of burn-in in the inter-pixel groove 50 which occurs in a long-term drive, so if the first obliquely evaporated alignment film 43A and the second obliquely evaporated alignment film 43B are formed so that at least a reduction in burn-in in both side surfaces of the inter-pixel groove 50 is expected, the evaporation angles θ1 and θ2 may be slightly different from each other. Moreover, although the thicknesses of the first obliquely evaporated alignment film 43A and the second obliquely evaporated alignment film 43B are preferably the same, the thicknesses may be slightly different within a range in which it can be expected that burn-in will be reduced.

Next, referring to FIGS. 13A through 13C, a method of forming an evaporated film in the case where the vertically evaporated film 43C is formed as the base film of the first obliquely evaporated alignment film 43A and the second obliquely evaporated alignment film 43B (refer to FIG. 10A) will be described below. FIGS. 13B and 13C show a state where the vacuum evaporation apparatus shown in FIG. 13A is viewed from an X1 direction.

In the vacuum evaporation apparatus 80, at first, as shown in FIG. 13A, the direction of the normal to the substrate surface of the pixel electrode substrate 40 and the incident direction of the evaporation particles 83 from the evaporation source 81 are adjusted to be in agreement with each other, and the vertically evaporated film 43C is formed from a vertical direction with respect to the substrate surface. As the evaporation particles 83, for example, silicon oxide is used as in the case of the first obliquely evaporated alignment film 43A and the second obliquely evaporated alignment film 43B. The vertically evaporated film 43C is evaporated from the vertical direction with respect to the substrate surface, so as shown in FIG. 10A, the vertically evaporated film 43C is formed on the whole top surfaces of the reflective pixel electrodes 42 and the whole bottom surface of the inter-pixel groove 50.

After that, in a state where vacuum is maintained, the pixel electrode substrate 40 is rotated by an angle θ to be inclined so that the direction of the normal to the substrate surface forms a predetermined angle θ (=θ1) with respect to the incident direction of the evaporation particles 83, thereby the evaporation particles 83 are entered from an oblique direction with respect to the substrate surface. Moreover, the incident direction in the plane is adjusted to be 180° different from the original alignment direction of the vertically aligned liquid crystal 45 (refer to FIG. 13B). Thereby, at first, the first obliquely evaporated alignment film 43A of silicon oxide is obliquely evaporated at an incident angle θ1 of, for example, 45° to 65° with respect to the direction of the normal to the substrate surface from the first oblique evaporation direction 85A which is 180° different from the original alignment direction of the vertically aligned liquid crystal 45. The first obliquely evaporated alignment film 43A is formed on the top surfaces of the reflective pixel electrodes 42 and the bottom surface of the inter-pixel groove 50 with the vertically evaporated film 43C in between.

Further, after that, in a state where vacuum is maintained, the pixel electrode substrate 40 is rotated by 180° in the plane to form the second obliquely evaporated alignment film 43B through evaporation from the second oblique evaporation direction 85B with respect to the substrate surface (refer to FIG. 13C). The step of forming the second obliquely evaporated alignment film 43B is the same as in the case where the above-described vertically evaporated film 43C is not formed. Thereby, as shown in FIG. 10A, the second obliquely evaporated alignment film 43B is formed on the top surfaces of the reflective pixel electrodes 42 with the vertically evaporated film 43C and the first obliquely evaporated alignment film 43A in between. The second obliquely evaporated alignment film 43B is formed on the bottom surface of the inter-pixel groove 50 with the vertically evaporated film 43C in between.

As described above, it is preferable that the first obliquely evaporated alignment film 43A, the second obliquely evaporated alignment film 43B and the vertically evaporated film 43C are successively formed in one vacuum evaporation apparatus 80. The word "successively" herein means that without breaking vacuum, films are formed in sequence. A method of forming each evaporated film with a different apparatus, or a method in which after forming one evaporated film, the vacuum is broken, and then another evaporated film is formed can be used, thereby effects to some extent can be obtained. However, in this case, it is required to keep interfaces between the evaporated films extremely clean. More specifically, for example, silicon oxide is susceptible to water absorption or adhesion of impurities, so chemical stability in the surface of each evaporated film is important. If the chemical stability is not sufficient, the bonding strength between the films is low, so the films may be separated, or the film structures may not be continuously connected, thereby ions or the like are trapped in the interfaces, thereby new burn-in may occur. When the films are successively formed without breaking vacuum, no problem such as water absorption occurs in the surface of each evaporated film, so the films can be formed in a state where the continuity of the films is very good.

When each evaporated film is successively formed, as shown in FIGS. 12A, 12B and 13A through 13C, it is preferable that a shutter 82 is disposed between the evaporation source 81 and the position where the pixel electrode substrate 40 is set, and the shutter 82 is opened or closed in synchronization with the substrate rotation system (not shown). More specifically, for example, in the case where the vertically evaporated film 43C is formed, after forming the vertically evaporated film 43C, the shutter 82 is closed to block the evaporation particles 83 temporarily. During that, the pixel electrode substrate 40 is rotated by the substrate rotation system, and the shutter 82 is opened again to form the first obliquely evaporated alignment film 43A. Likewise, by opening or closing the shutter 82, the second obliquely evaporated alignment film 43B is formed. Thus, it is preferable but not necessary that the evaporation particles 83 are temporarily blocked with the shutter 82 or the like to form each evaporated film. A method without using the shutter 82 in which while vertical evaporation is performed, the pixel electrode substrate 40 is rotated at some midpoint to shift oblique evaporation without interruption can be used.

The vertically evaporated film 43C preferably has a thickness of 10 nm or more, because if the thickness is too thin, a good quality film with high density and high resistivity cannot formed. The upper limit of the thickness is preferably 500 nm or less, because if the thickness is too thick, film formation time is longer, so the film quality and practicability decline. More preferably, a thickness specifically suitable for practical use is 30 nm to 100 nm.

Although the case where each evaporated film is laminated directly on the reflective pixel electrodes 42 is described above, a structure in which another film is disposed on the reflective pixel electrodes 42 and each evaporated film is laminated on the film may be applied. For example, in the case where an aluminum electrode is used as the reflective pixel electrode 42, the surface of the aluminum electrode is chemically unstable, so there may be cases where the whole pixel electrode is covered with a protective film called a passivation film generally made of an oxide or a nitride. In this case, the structure of the alignment film according to the embodiment is effective.

Figure 10B:
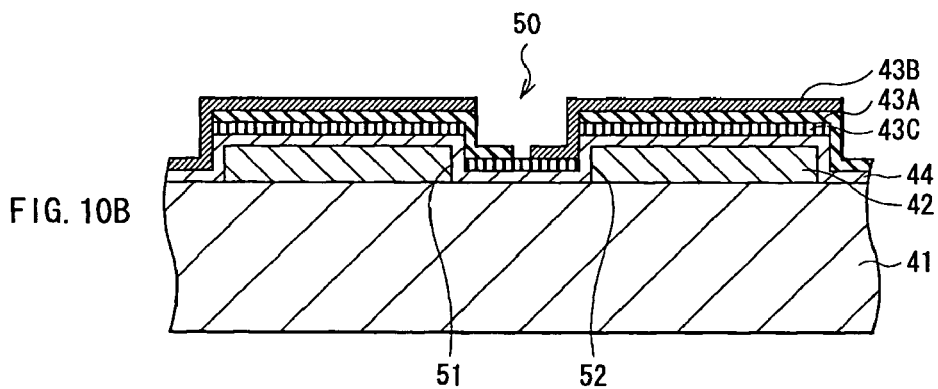

FIG. 10B shows an example of the film structure shown in FIG. 10A in which a passivation film is further included. A passivation film 44 is formed through a film formation technique such as CVD (Chemical Vapor Deposition) in, for example, a LSI process, and the whole top surfaces of the pixel electrodes 42, the side surfaces and the bottom surface of the inter-pixel groove 50 are overcoated substantially uniformly with the passivation film 44. As in the case of the film structure shown in FIG. 9 or FIG. 10A, each evaporated film may be laminated on the passivation film 44.

In addition, in order to further improve the reflectivity of the reflective pixel electrode 42, there may be cases that a dielectric mirror made of a laminate film including oxide films or nitride films with different refractive indexes is disposed on the electrode. In this case, the structure of the alignment film according to the embodiment is effective.

Next, functions and actions of the reflective liquid crystal display device formed as described above will be described below.

In the reflective liquid crystal display device, incident light L1 entering from the transparent electrode substrate 30 and passing through the vertically aligned liquid crystal 45 is reflected by a reflection function of the reflective pixel electrode 42. The light L1 reflected by the reflective pixel electrode 42 passes through the vertically aligned liquid crystal 45 and the transparent electrode substrate 30 to an opposite direction to a direction where the light is entered so as to be emitted. At this time, the optical characteristics of the vertically aligned liquid crystal 45 are changed according to a potential difference between facing electrodes, thereby the light L1 passing through the vertically aligned liquid crystal 45 is modulated. Therefore, by the light modulation, gray levels can be produced, and modulated light L2 is used for image display.

A voltage is applied to the vertically aligned liquid crystal 45 by the pixel drive circuit 61 shown in FIG. 8. The data driver 62 provides image signals to the data line 71 according to the image signals D from outside which are inputted through the signal line 64. The scan driver 63 successively provides scanning signals to each scanning line 72 with predetermined timing. Thereby, pixels in a portion where the scanning signals from the scanning line 72 scan and the image signals from the data line 71 are applied are selectively driven.

In the reflective liquid crystal display device, the following functions and effects can be obtained by the film structure on the side of the pixel electrode substrate 40. In the reflective liquid crystal display device, as shown in FIG. 9, in a sectional surface of the pixel electrode substrate 40 in a thickness direction, the first obliquely evaporated alignment film 43A is formed on the first side surface 51 of the inter-pixel groove 50 through evaporation, and the second obliquely evaporated alignment film 43B is formed on the second side surface 52 facing the first side surface 51 through evaporation. Thereby, the film structures of both side surfaces of the inter-pixel groove 50 in the sectional surface are symmetric. Therefore, an electrical bias during drive due to the asymmetric structure is eliminated, and burn-in in the inter-pixel groove 50 in a long-term drive can be prevented, so extremely high reliability can be obtained.

Moreover, as shown in FIG. 10A, in the case where the vertically evaporated film 43C is disposed as a base film, the following functions and effects can be obtained. For example, the vertically evaporated film 43C made of silicon oxide does not have a columnar structure and has a high density and high resistivity, compared to the first obliquely evaporated alignment film 43A and the second obliquely evaporated alignment film 43B made of the same silicon oxide. Therefore, the vertically evaporated film 43C functions as an electrically shielding layer between the first obliquely evaporated alignment film 43A, the second obliquely evaporated alignment film 43B and the reflective pixel electrode 42.

The obliquely evaporated silicon oxide film forms a columnar structure inclined to the evaporation direction. It is considered that such a structure can give a pretilt angle to a vertical liquid crystal; however, the structure has a large number of gaps between particles, so the film is not exactly dense. Therefore, ions or the like generated from the reflective pixel electrode 42 during drive easily pass through the silicon oxide film, so the silicon oxide film has relatively low resistivity. Therefore, in the case of a long-term drive, ions or the like are introduced into a liquid crystal cell, and the deviation of ions occurs in the liquid crystal cell, thereby resulting in so-called burn-in. In the case where the vertically evaporated film 43C is disposed, the flow of ions or the like through the first and the second obliquely evaporated alignment films 43A and 43B can be prevented. As a result, a device with superior long-term reliability in which no burn-in of ions occurs even in a long-term drive can be achieved.

Moreover, specifically in the case where the vertically evaporated film 43C and the first obliquely evaporated alignment film 43A and the second obliquely evaporated alignment film 43B are formed of the same silicon oxide films, the first obliquely evaporated alignment film 43A and the second obliquely evaporated alignment film 43B of silicon oxide are formed on the base film made of the same silicon oxide, so compared to the case where an alignment film is formed directly on the reflective pixel electrode 42, higher film quality can be obtained.

Further, when film formation is carried out through only oblique evaporation, a region where no evaporated film is formed may exist specifically in the bottom surface of the inter-pixel groove 50; however, when vertical evaporation is performed, a film can be formed on the whole bottom surface of the inter-pixel groove 50. Thereby, the following functions and effects can be obtained.

For example, an evaporated film of silicon oxide has a property of aligning liquid crystal molecules in the evaporation direction, so in a portion of the liquid crystal in contact with the vertically evaporated film 43C, liquid crystal molecules are aligned vertically with respect to the substrate surface, and in a portion of the liquid crystal in contact with the second obliquely evaporated film 43B, liquid crystal molecules are obliquely aligned at a pretilt angle with respect to the substrate surface.

In a region of the inter-pixel groove 50 where no alignment film is formed, the liquid crystal is not vertically aligned and out of alignment, so the region has an adverse effect on the alignment of the liquid crystal which is vertically aligned on the reflective pixel electrode 42. On the other hand, in the case where the vertically evaporated film 43C is formed as a base film, in the region, the liquid crystal is aligned in a vertical direction by the vertically evaporated film 43C, so the region hardly has an adverse effect on the vertical alignment of the liquid crystal on the reflective pixel electrode 42. The alignment of the liquid crystal by the second obliquely evaporated alignment film 43B is slightly different from the alignment of the liquid crystal by the vertically evaporated film 43C, because the alignment by the second obliquely evaporated alignment film 43B has a pretilt angle. However, in general, the pretilt angle is as small as 1° to 5°, so there is no discernible difference between the alignments as display image quality. Therefore, in the case where the vertically evaporated film 43C is formed as the base film, misalignment does not occur around the inter-pixel groove, so stable vertical alignment can be achieved throughout the display region. Thereby, superior image quality can be achieved.

As described above, in the reflective liquid crystal display device according to the embodiment, in the sectional surface of the pixel electrode substrate 40 in a thickness direction, the first obliquely evaporated alignment film 43A is formed on the first side surface 51 of the inter-pixel groove 50 through evaporation, and the second obliquely evaporated alignment film 43B is formed on the second side surface 52 facing the first side surface 51 through evaporation, so the film structures of both side surfaces of the inter-pixel groove 50 in the sectional surface is symmetric. Thereby, burn-in in a long-term drive which occurs due to the asymmetric structures of the side surfaces of the inter-pixel groove 50 can be prevented, so long-term drive reliability can be achieved.

<Description of Liquid Crystal Display Unit>

Figure 14:
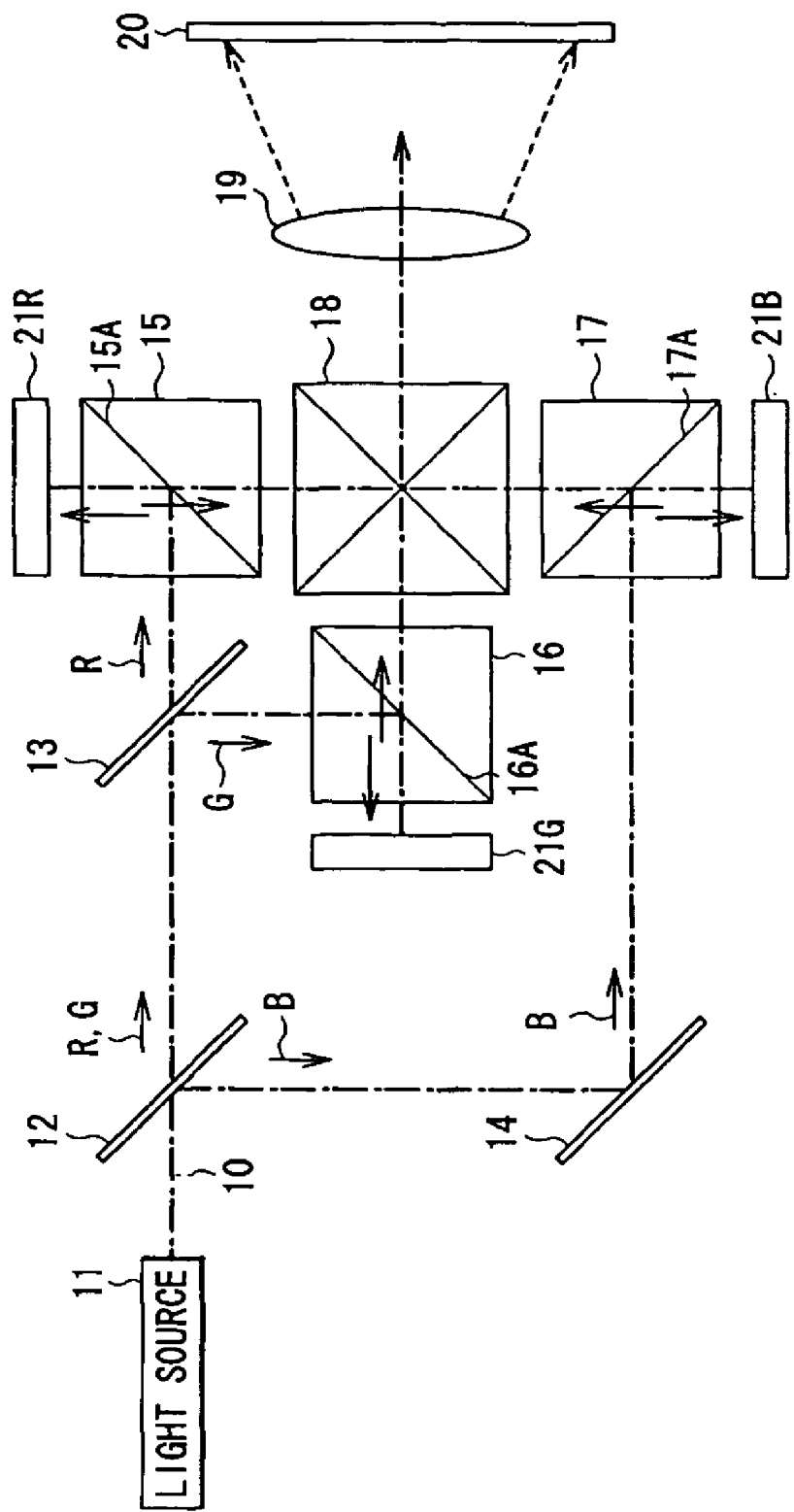
FIG. 14 is an illustration of an example of a liquid crystal display unit using the reflective liquid crystal display device shown in FIG. 7.

Next, an example of a liquid crystal display unit using the reflective liquid display device with the structure shown in FIG. 7 will be described below. As shown in FIG. 14, an example of a reflective liquid crystal projector using the reflective liquid crystal display device as a light valve will be described below.

The reflective liquid crystal projector shown in FIG. 14 is a so-called three-panel system using three liquid crystal light valves 21R, 21G and 21B for red, green and blue to display a color image. The reflective liquid crystal projector comprises a light source 11, dichroic mirrors 12 and 13 and a total reflection mirror 14 along an optical axis 10. The reflective liquid crystal projector further comprises polarizing beam splitters 15, 16 and 17, a synthesizing prism 18, a projection lens 19 and a screen 20.

The light source 11 emits white light including red light (R), blue light (B) and green light (G) which are required to display a color image, and as light source 11, for example, a halogen lamp, a metal halide lamp, a xenon lamp or the like is used.

The dichroic mirror 12 has a function of separating light from the light source 11 into blue light and light of other colors. The dichroic mirror 13 has a function of separating light passing through the dichroic mirror 12 into red light and green light. The total reflection mirror 14 reflects the blue light separated by the dichroic mirror 12 toward the polarizing beam splitter 17.

The polarizing beam splitters 15, 16 and 17 are disposed along the optical paths of red light, green light and blue light, respectively. The polarizing beam splitter 15, 16 and 17 have polarization splitting surfaces 15A, 16A and 17A, respectively, and have a function of dividing each incident color light into two polarized components orthogonal to each other on the polarization splitting surfaces 15A, 16A and 17A. The polarization splitting surfaces 15A, 16A and 17A reflect one polarized component (for example, S-polarized component) and pass the other polarized component (for example, P-polarized component) therethrough.

As the liquid crystal light valves 21R, 21G and 21B, reflective liquid crystal display devices with the above-described structure (refer to FIG. 7) are used. A predetermined polarized component (for example, S-polarized component) of each color light divided by each of the polarization splitting surfaces 15A, 16A and 17A of the polarizing beam splitters 15, 16 and 17 enters into each of the liquid crystal light valves 21R, 21G and 21B. When the liquid crystal light valves 21R, 21G and 21B are driven by a drive voltage given according to image signals, the liquid crystal light valves 21R, 21G and 21B have a function of modulating incident light and reflecting the modulated light toward the polarizing beam splitters 15, 16 and 17, respectively.

The synthesizing prism 18 has a function of synthesizing the predetermined polarized component (for example, P-polarized component) of each color light which is emitted from each of liquid crystal light valves 21R, 21G and 21B and passes through each of the polarizing beam splitters 15, 16 and 17. The projection lens 19 has a function as a projection means of projecting synthesized light emitted from the synthesizing prism 18 toward the screen 20.

In the reflective liquid crystal projector with the above structure, white light emitted from the light source 11 is separated into blue light and light of other colors (red light and green light) by the function of the dichroic mirror 12. The blue light is reflected toward the polarizing beam splitter 17 by the function of the total reflection mirror 14. The light of other colors are separated into red light and green light by the function of the dichroic mirror 13. The red light and the green light enter into the polarizing beam splitters 15 and 16, respectively.

The polarizing beam splitters 15, 16 and 17 divide each incident color light into two polarized components orthogonal to each other on the polarization splitting surfaces 15A, 16A and 17A, respectively. At this time, the polarization splitting surfaces 15A, 16A and 17A reflect one polarized component (for example, S-polarized component) toward the liquid crystal light valves 21R, 21G and 21B, respectively.

The liquid crystal light valves 21R, 21G and 21B are driven by a drive voltage given according to image signals, and modulate the predetermined polarized component of each color light entered into the liquid crystal light valves 21R, 21G and 21B on a pixel-by-pixel basis. At this time, as the liquid crystal light valves 21R, 21G and 21B, the reflective liquid crystal display devices shown in FIG. 7 are used, so superior characteristics regarding contrast and image quality can be achieved.

The liquid crystal light valves 21R, 21G and 21B reflect each modulated color light toward the polarizing beam splitters 15, 16 and 17, respectively. The polarizing beam splitters 15, 16 and 17 pass only a predetermined polarized component (for example, P-polarized component) among reflected (modulated) light from the liquid crystal light valves 21R, 21G and 21B, respectively, to emit the predetermined polarized component toward the synthesizing prism 18. The synthesizing prism 18 synthesizes the predetermined components of each color light having passed through the polarizing beam splitters 15, 16 and 17 to emit the synthesized light to the projection lens 19. The projection lens 19 projects the synthesized light emitted from the synthesizing prism 18 toward the screen 20. Thereby, an image according to the light modulated by the liquid crystal light valves 21R, 21G and 21B is projected on the screen 20 so as to display a desired image.

As described above, in the reflective liquid crystal projector according to the embodiment, the reflective liquid crystal display devices (refer to FIG. 7) with a structure including a laminate of two obliquely evaporated alignment films 43A and 43B as the pixel electrode substrate 40 (refer to FIG. 9) are used as the liquid crystal light valves 21R, 21G and 21B, so long-term reliability can be achieved, and an image with high contrast and superior image quality can be displayed.

EXAMPLES

Next, specific characteristics of the reflective liquid crystal display device according to the embodiment will be described referring to examples. Before describing the examples, as comparative examples, the characteristics of a reflective liquid crystal display device of the related art will be described below.

Comparative Examples 1-1 and 1-2

Comparative Examples 1-1 and 1-2 will be described below. A test sample of the reflective liquid crystal display device as a comparative example was formed as below. At first, after a glass substrate on which a transparent electrode was formed and a silicon drive substrate on which an aluminum electrode was formed as a reflective pixel electrode were cleaned, they were introduced into an evaporation apparatus to form a silicon oxide film as an alignment film through oblique evaporation so that evaporation particles were evaporated at an incident evaporation angle of 55° with respect to the substrate in a diagonal direction of a square pixel. The alignment film had a thickness of 80 nm. The alignment was controlled so that the pretilt angle of the liquid crystal was approximately 2.5°. After that, the substrates on which the alignment film was formed faced each other, and an adequate number of glass beads with a diameter of 2 μm were distributed therebetween to bond the substrates together. Further, a vertical liquid crystal material with negative dielectric anisotropy Δε manufactured by Merck was injected between the substrates so as to form the test sample of the reflective liquid crystal display device. A pixel pitch of the aluminum electrode on the silicon drive substrate was 9 μm, and the width of a groove between pixels was 0.6 μm. Moreover, a test sample in which a passivation film of $SiO_2$ with a thickness of 45 nm for protecting the pixel electrode was overcoated on the aluminum electrode through CVD was formed through the same method.

The test samples were introduced into a projector, and a gray level determined by ±2 V was displayed on the whole screen (1920 pixels×1080 pixels) by drive waveforms shown in FIGS. 6A and 6B, and a white frame determined by ±4 V of 100 pixels×100 pixels is displayed for a long period of time, thereby burn-in in an inter-pixel groove was observed. As a result, after continuous drive for 1000 hours, a portion with slightly different intensity from the other portion, for example, a portion with slightly less intensity at an edge of the white frame was observed around an inter-pixel groove portion in a boundary between the above white frame and gray level pixels (in Comparative Example 1-1). When the portion was observed with a microscope, flicker was observed in the groove portion, so it was found out that ions were gathered specifically in the portion. Moreover, when the power was turned off, and the test sample was left for a few tens of hours, burn-in was faded, but a slight trace of the burn-in was remained.

The above phenomenon occurred in the case of the substrate in which the passivation film of $SiO_2$ was disposed on the aluminum electrode (in Comparative Example 1-2). The observation results are shown in FIG. 15 together with results of examples which will be described later.

Examples 1-1 and 1-2

Next, Examples 1-1 and 1-2 will be described below. Basically, a test sample of the reflective liquid crystal display device was formed according to the same method and the same specifications as those in the above comparative examples, except for the alignment film on the pixel electrode. More specifically, after a glass substrate on which a transparent electrode was formed and a silicon drive substrate on which an aluminum electrode was formed as a reflective pixel electrode were cleaned, an alignment film was formed through evaporation by a method described below, and then a vertical liquid crystal material with negative dielectric anisotropy Δε manufactured by Merck was injected between the substrates to form a reflective liquid crystal display device (as Example 1-1). The specifications of the silicon drive substrate was the same as those in the above comparative examples, so a pixel pitch was 9 μm and the width of a groove between pixels was 0.6 μm. A reflective liquid crystal display device in which a passivation film was formed on the aluminum electrode (as Example 1-2) was formed in a like manner.

However, unlike the above comparative examples, in the examples, the alignment film on the pixel electrode had a structure corresponding to FIG. 9. A method of forming the alignment film will be described below. As shown in FIGS. 12A and 12B, the cleaned silicon drive substrate was introduced into the evaporation apparatus 80 with a substrate rotation system in which the incident angle of the evaporation particles 83 with respect to the direction of the normal to the substrate and the incident direction of the evaporation particles 83 in the substrate surface could be changed. At first, as in the case of the comparative examples, the substrate was inclined so that the evaporation angle became θ=55° from the direction of the normal, and the substrate was rotated by 180° in a plane from the original alignment direction in the comparative examples to form a first obliquely evaporated alignment film through oblique evaporation. The film thickness was 40 nm. After that, the substrate was rotated by 180° in the plane again to form a second obliquely evaporated alignment film with a thickness of 40 nm at the same incident evaporation angle of 55° from the original alignment direction in the comparative examples. The thickness of the alignment film in the comparative examples was 80 nm, so the thickness of each film was designed to be 40 nm, so that the total thickness of the first obliquely evaporated alignment film and the second obliquely evaporated alignment film was the same as the thickness of the alignment film in the comparative examples. The substrate on the transparent electrode side was formed under the same conditions so as to maintain the symmetry of the structure.

The test samples with the pixel structure were introduced into the projector as in the case of the above comparative examples, and the test samples were driven by the same method to observe burn-in. In Example 1-1, burn-in in the inter-pixel groove which was observed in the comparative examples was not at all observed even after a lapse of 1000 hours or more. Likewise, in Example 1-2, no burn-in was observed in the substrate in which the passivation film of $SiO_2$ was disposed on the aluminum electrode. The results are shown in FIG. 15.

It was not necessary that the thicknesses and the incident angles of the first obliquely evaporated alignment film and the second obliquely evaporated alignment film were absolutely the same, and when the obliquely evaporated alignment films were formed on the side surfaces of the inter-pixel groove to some extent, an effect of preventing burn-in could be obtained.

Examples 2-1 and 2-2

Next, Examples 2-1 and 2-2 will be described below. In the examples, an alignment film on the pixel electrode had a structure corresponding to FIG. 10A, that is, a structure in which as a base film of the first obliquely evaporated alignment film and the second obliquely evaporated alignment film, a vertically evaporated film was formed. Test samples of the reflective liquid crystal display device were formed through the same method and the same specifications as those in the above comparative examples, except for a portion relating to the formation of the films.

The method of forming the alignment film will be described below. As shown in FIGS. 13A through 13C, the cleaned silicon drive substrate was introduced into the evaporated apparatus 80 with a substrate rotation system in which the incident angle of the evaporation particles 83 with respect to the direction of the normal to the substrate and the incident direction of the evaporation particles 83 in the substrate surface could be changed. At first, silicon oxide was evaporated with a thickness of 50 nm from a vertical direction with respect to the substrate. After that, as in the case of Examples 1-1 and 1-2, the substrate was inclined so that the evaporation angle became θ=55° from the direction of the normal, and the substrate was rotated by 180° in a plane to form the first obliquely evaporated alignment film through oblique evaporation. The thickness was 40 nm. After that, as in the case of Examples 1-1 and 1-2, the substrate was rotated by 180° in the plane again to form the second obliquely evaporated alignment film with a thickness of 40 nm at the same incident evaporation angle of 55° from the original alignment direction in the comparative examples. The substrate on the transparent electrode side was formed under the same conditions so as to maintain the symmetry of the structure. A reflective liquid crystal display device in which a passivation film was disposed on the aluminum electrode (as Example 2-2) was formed in a like manner.

In Example 2-1, burn-in was observed in a like manner. In the examples, burn-in which was observed in the comparative examples was not at all observed even after a lapse of 1000 hours or more. Likewise, in Example 2-2, no burn-in was obeserved in the substrate in which the passivation film of $SiO_2$ was disposed on the aluminum electrode. The results are shwon in FIG. 15.

It was not necessary that the thicknesses and the incident angles of the first obliquely evaporated alignment film and the second obliquely evaporated alignment film were absolutely the same, and when the obliquely evaporated alignment films were formed on the side surfaces of the inter-pixel groove to some extent, an effect of preventing burn-in could be obtained.

As the results, it was found out that if the thickness of the vertically evaporated film was too thin, a good quality film with high density and high resistivity could not be formed, so the lower limit of the thickness was preferably 10 nm or more, and if the thickness was too thick, film formation time would be longer, thereby the film quality and practicability would decline, so the upper limit was preferably 500 nm or less. More preferably, a thickness specifically suitable for practical use was 30 nm to 100 nm.

The present invention is described referring to the embodiment and the examples, but the invention is not limited to the embodiment and the examples, and is variously modified. For example, in the above embodiment, the three-panel system projector is described as an example of the projector. However, the invention can be widely applied to any other system projectors such as a single panel system.

While the invention has been described with reference to specific embodiment chosen for purpose of illustration, it should be apparent that numerous modification could be made thereto by those skilled in the art without departing from the basic concept and scope of the invention.

What is claimed is:

1. A reflective liquid crystal display device, comprising a pixel electrode substrate and a transparent electrode substrate facing each other with a vertically aligned liquid crystal in between, wherein the pixel electrode substrate includes:
   a plurality of reflective pixel electrodes;
   a first obliquely evaporated alignment film formed through evaporation from a first oblique evaporation direction with respect to a substrate surface of the pixel electrode substrate after forming the pixel electrodes; and
   a second obliquely evaporated alignment film, formed through evaporation from a second oblique evaporation direction with respect to the substrate surface of the pixel electrode substrate after forming the first obliquely evaporated alignment film,
   wherein,
   the first obliquely evaporated alignment film is formed on the whole top surfaces of the pixel electrodes and a first side surface of a groove portion between adjacent pixel electrodes in a sectional surface of the pixel electrode substrate in a thickness direction through evaporation,
   the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation,
   each of the pixel electrodes has a square shape, and
   the first oblique evaporation direction or the second oblique evaporation direction, as projected onto the surface, is along a diagonal of the pixel electrodes,
   obliquely inclined in the substrate surface with respect to the pixel electrode substrate, and
   parallel to the alignment direction of the vertically aligned liquid crystal.

2. The reflective liquid crystal display device according to claim 1, wherein the first obliquely evaporated alignment film and the second obliquely evaporated alignment film are evaporated films of silicon oxide.

3. The reflective liquid crystal display device according to claim 1, wherein the first obliquely evaporated alignment film and the second obliquely evaporated alignment film are formed through evaporation from directions which are 180° different from each other in the substrate surface.

4. A reflective liquid crystal display device comprising a pixel electrode substrate and a transparent electrode substrate facing each other with a vertically aligned liquid crystal in between, wherein the pixel electrode substrate includes:
   a plurality of reflective pixel electrodes;
   a first obliquely evaporated alignment film formed through evaporation from a first oblique evaporation direction with respect to a substrate surface of the pixel electrode substrate after forming the pixel electrodes; and
   a second obliquely evaporated alignment film formed through evaporation from a second oblique evaporation direction with respect to the substrate surface of the pixel electrode substrate after forming the first obliquely evaporated alignment film,
   wherein
   the first obliquely evaporated alignment film is formed on the whole top surfaces of the pixel electrodes and a first side surface of a groove portion between adjacent pixel electrodes in a sectional surface of the pixel electrode substrate in a thickness direction through evaporation,
   the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation, and
   a vertically evaporated film is formed on the whole top surfaces of the pixel electrodes and the whole bottom surface of the groove portion between the adjacent pixel electrodes through evaporation from a vertical direction with respect to the substrate surface of the pixel electrode substrate, and after forming the vertically evaporated film, the first obliquely evaporated alignment film and the second obliquely evaporated alignment film are laminated on the vertically evaporated film.

5. A liquid crystal display unit comprising:
   a reflective liquid crystal display device, wherein the liquid crystal display unit displays an image by using light modulated by the reflective liquid crystal display device, the reflective liquid crystal display device comprising:
   a pixel electrode substrate;
   a transparent electrode substrate facing the pixel electrode substrate; and
   a vertically aligned liquid crystal injected between the pixel electrode substrate and the transparent electrode substrate, the pixel electrode substrate including:
      a plurality of reflective pixel electrodes; a first obliquely evaporated alignment film formed through evaporation from a first oblique evaporation direction with respect to a surface of the pixel electrode substrate after forming the pixel electrodes; and
      a second obliquely evaporated alignment film formed through evaporation from a second oblique evaporation direction with respect to the substrate surface of the pixel electrode substrate after forming the first obliquely evaporated alignment film,
   wherein,
      the first obliquely evaporated alignment film is formed on the whole top surfaces of the pixel electrodes and a first side surface of a groove portion between adjacent pixel electrodes in a sectional surface of the pixel electrode substrate in a thickness direction through evaporation,
      the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation,
      a vertically evaporated film is formed on the whole top surfaces of the pixel electrodes and the whole bottom surface of the groove portion between the adjacent pixel electrodes through evaporation from a vertical direction with respect to the substrate surface of the pixel electrode substrate, and
      after forming the vertically evaporated film, the first obliquely evaporated alignment film and the second obliquely evaporated alignment film are laminated on the vertically evaporated film.

6. A liquid crystal display unit according to claim 5, further comprising:
   a light source; and
   a projection means of projecting light emitted from the light source and modulated by the reflective liquid crystal display device to a screen,
   wherein the liquid crystal display unit is used as a reflective liquid crystal projector.

7. A method of manufacturing a reflective liquid crystal display device, the reflective liquid crystal display device comprising a pixel electrode substrate including a plurality of reflective pixel electrodes and a transparent electrode substrate including a transparent electrode which face each other with a vertically aligned liquid crystal in between, the method comprising the steps of:
   forming a first obliquely evaporated alignment film though evaporation from a first oblique evaporation direction with respect to a substrate surface of the pixel electrode substrate after forming the pixel electrodes, wherein the step of forming the first obliquely evaporated alignment film includes forming the first obliquely evaporated alignment film on the whole top surfaces of the pixel electrodes and a first side surface of a groove portion between adjacent pixel electrodes in a sectional surface of the pixel electrode substrate in a thickness direction through evaporation;
   forming a second obliquely evaporated alignment film through evaporation from a second oblique evaporation direction with respect to the substrate surface of the pixel electrode substrate after forming the first obliquely evaporated alignment film, wherein the step of forming the second obliquely evaporated alignment film includes forming the second obliquely evaporated alignment film on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation; and
   forming a vertically evaporated film on the whole top surfaces of the pixel electrodes and the whole bottom surface of the groove portion between the adjacent pixel electrodes through evaporation from a vertical direction with respect to the substrate surface of the pixel electrode substrate, wherein, after forming the vertically evaporated film, the first obliquely evaporated alignment film and the second obliquely evaporated alignment film are laminated on the vertically evaporated film.

8. The method of manufacturing a reflective liquid crystal display device according to claim 7, wherein the first obliquely evaporated alignment film and the second obliquely evaporated alignment film are evaporated films of silicon oxide.

9. The method of manufacturing a reflective liquid crystal display device according to claim 7, wherein the first obliquely evaporated alignment film and the second obliquely evaporated alignment film are formed though evaporation from directions which are 180° different from each other in a substrate surface.

10. The method of manufacturing a reflective liquid crystal display device according to claim 7, wherein the direction of the normal to the substrate surface of the pixel electrode substrate and the incident direction of an evaporation material from an evaporation source are adjusted to be in agreement with each other, and the vertically evaporated film is formed under vacuum, and after that, in the state where vacuum is maintained, the pixel electrode substrate is inclined in order so that the direction of the normal to the substrate surface forms an angle corresponding to the first oblique evaporation direction and the second oblique evaporation direction with respect to the incident direction of the evaporation material, thereby the first obliquely evaporated alignment film and the second obliquely evaporated alignment film are formed through evaporation from an oblique direction with respect to the substrate surface.

11. A reflective liquid crystal display device comprising a pixel electrode substrate and a transparent electrode substrate facing each other with a vertically aligned liquid crystal in between, wherein the pixel electrode substrate includes:
   a plurality of reflective pixel electrodes;
   a first obliquely evaporated alignment film formed through evaporation from a first oblique evaporation direction with respect to a substrate surface of the pixel electrode substrate after forming the pixel electrodes; and
   a second obliquely evaporated alignment film formed through evaporation from a second oblique evaporation direction with respect to the substrate surface of the pixel electrode substrate after forming the first obliquely evaporated alignment film,
   wherein
   the first obliquely evaporated alignment film is formed on the whole top surfaces of the pixel electrodes and a first side surface of a groove portion between adjacent pixel electrodes in a sectional surface of the pixel electrode substrate in a thickness direction through evaporation,
   the second obliquely evaporated alignment film is formed on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation,
   a film of an oxide or a nitride or a laminate film thereof is formed on the whole top surfaces of the pixel electrodes and the whole groove portion between the adjacent pixel electrodes, and
   the first obliquely evaporated alignment film and the second obliquely evaporated alignment film are laminated on the film or the laminate film.

12. A method of manufacturing a reflective liquid crystal display device, the reflective liquid crystal display device comprising a pixel electrode substrate including a plurality of reflective pixel electrodes and a transparent electrode substrate including a transparent electrode which face each other with a vertically aligned liquid crystal in between, the method comprising the steps of:
   forming a first obliquely evaporated alignment film through evaporation from a first oblique evaporation direction with respect to a substrate surface of the pixel electrode substrate after forming the pixel electrodes, wherein the step of forming the first obliquely evaporated alignment film includes forming the first obliquely evaporated alignment film on the whole top surfaces of the pixel electrodes and a first side surface of a groove portion between adjacent pixel electrodes in a sectional surface of the pixel electrode substrate in a thickness direction through evaporation;
   forming a second obliquely evaporated alignment film through evaporation from a second oblique evaporation direction with respect to the substrate surface of the pixel electrode substrate after forming the first obliquely evaporated alignment film, wherein the step of forming the second obliquely evaporated alignment film includes forming the second obliquely evaporated alignment film on the whole top surfaces of the pixel electrodes with the first obliquely evaporated alignment film in between and a second side surface facing the first side surface in the groove portion between the adjacent pixel electrodes in the sectional surface of the pixel electrode substrate in the thickness direction through evaporation; and
   forming a film of an oxide or a nitride or a laminate film thereof on the whole top surfaces of the pixel electrodes and the whole groove portion between the adjacent pixel electrodes on a surface of the pixel electrode substrate facing the transparent electrode substrate, wherein the first obliquely evaporated alignment film and the second obliquely evaporated alignment film are laminated on the film or the laminate film.

* * * * *